United States Patent
Horton et al.

(10) Patent No.: US 12,061,650 B2
(45) Date of Patent: Aug. 13, 2024

(54) SYSTEMS, METHODS, COMPUTING PLATFORMS, AND STORAGE MEDIA FOR COMPARING NON-ADJACENT DATA SUBSETS

(71) Applicant: Unsupervised, Inc., Boulder, CO (US)

(72) Inventors: Noah Horton, Boulder, CO (US); Bryce Chriestenson, Denver, CO (US); Tyler H. Willis, Sanford, NC (US)

(73) Assignee: Unsupervised, Inc., Boulder, CO (US)

( * ) Notice: Subject to any disclaimer, the term of this patent is extended or adjusted under 35 U.S.C. 154(b) by 0 days.

(21) Appl. No.: 18/322,425

(22) Filed: May 23, 2023

(65) Prior Publication Data
US 2023/0418871 A1 Dec. 28, 2023

Related U.S. Application Data

(63) Continuation of application No. 16/986,985, filed on Aug. 6, 2020, now Pat. No. 11,687,591.
(Continued)

(51) Int. Cl.
*G06F 7/00* (2006.01)
*G06F 7/08* (2006.01)
*G06F 16/28* (2019.01)
*G06F 16/901* (2019.01)
*G06F 16/904* (2019.01)
(Continued)

(52) U.S. Cl.
CPC ............ *G06F 16/9024* (2019.01); *G06F 7/08* (2013.01); *G06F 16/287* (2019.01); *G06F 16/904* (2019.01); *G06N 5/04* (2013.01); *G06N 20/00* (2019.01)

(58) Field of Classification Search
CPC .. G06F 16/287; G06F 16/9024; G06F 16/904; G06F 16/245; G06F 16/53; G06F 16/3331; G06F 16/338; G06F 16/3349; G06F 16/3344; G06F 7/08; G06F 7/22; G06F 7/24; G06F 7/26; G06N 20/00; G06N 5/04
See application file for complete search history.

(56) References Cited

U.S. PATENT DOCUMENTS

| 9,645,999 B1 | 5/2017 | Ciulla et al. |
| 10,755,338 B1 | 8/2020 | Truang et al. |

(Continued)

OTHER PUBLICATIONS

Sana. Mohammad Azam, "Office Action Regarding U.S. Appl. No. 16/986,985", May 26, 2022, p. 30, Published in: US.
(Continued)

*Primary Examiner* — Mohammad A Sana
(74) *Attorney, Agent, or Firm* — Neugeboren O'Dowd PC

(57) ABSTRACT

Systems, methods, computing platforms, and storage media for comparing non-adjacent data subsets are disclosed. Exemplary implementations may: receive an input data set, the input data set including information to be analyzed; generate at least one list of data subsets of the input data set; determine whether at least one data subset of the at least one list of data subsets contains a notable characteristic; identify at least one data pattern in the at least one list of data subsets of the input data set; sort data subsets of the at least one list of data subsets of the input data set; and display, via a user interface, the data subsets of the at least one list of data subsets, based on the sorting.

20 Claims, 17 Drawing Sheets

Related U.S. Application Data

(60) Provisional application No. 62/883,405, filed on Aug. 6, 2019, provisional application No. 62/883,403, filed on Aug. 6, 2019.

(51) Int. Cl.
   *G06N 5/04* (2023.01)
   *G06N 20/00* (2019.01)

(56) References Cited

U.S. PATENT DOCUMENTS

| | | |
|---|---|---|
| 11,106,442 B1 | 8/2021 | Hsiao et al. |
| 11,687,591 B2 | 6/2023 | Horton et al. |
| 2006/0140501 A1* | 6/2006 | Tadas ............... G06T 5/20 382/260 |
| 2009/0157738 A1* | 6/2009 | Lection ............ G06F 16/58 |
| 2012/0330979 A1 | 12/2012 | Elson et al. |
| 2016/0026968 A1 | 1/2016 | Fan et al. |
| 2016/0055196 A1* | 2/2016 | Collins ............. G06F 16/93 707/690 |
| 2016/0140454 A1 | 5/2016 | Gupta et al. |
| 2017/0076488 A1 | 3/2017 | Stanton et al. |
| 2017/0154291 A1 | 6/2017 | Dau et al. |
| 2020/0175522 A1* | 6/2020 | Zhang .............. G06Q 10/06393 |
| 2021/0042331 A1 | 2/2021 | Horton et al. |
| 2021/0042360 A1 | 2/2021 | Waugh et al. |

OTHER PUBLICATIONS

Giuliani, Giuseppi J, "Office Action Issued in U.S. Appl. No. 16/986,956", Mar. 6, 2023, p. 33, Published in: US.

Giuliani. Giuseppi J, "Office Action Regarding U.S. Appl. No. 16/986,956", Jun. 6, 2022, p. 32, Published in: US.

Wikipedia, "Decision Tree Learning", Downloadedf from https://en.wikipedia.org/wiki/Decision_tree_learning on Nov. 12, 2020, Aug. 6, 2019, p. 3.

Neugeboren, Craig "Response to Office Action Regarding U.S. Appl. No. 16/986,985", Nov. 9, 2022, p. 8, Published in: US.

Neugeboren, Craig, "Response to Office Action Regarding U.S. Appl. No. 16/986,956", Dec. 1, 2022, p. 12, Published in: US.

Neugeboren, Craig, "Response to Office Action Issued in U.S. Appl. No. 16/986,956", Sep. 5, 2023, p. 12, Published in: US.

* cited by examiner

SYSTEMS, METHODS, COMPUTING PLATFORMS, AND STORAGE MEDIA FOR COMPARING NON-ADJACENT DATA SUBSETS

CLAIM OF PRIORITY UNDER 35 U.S.C. § 119

The present Application is a Continuation of pending U.S. patent application Ser. No. 16/986,985 entitled "SYSTEMS, METHODS, COMPUTING PLATFORMS, AND STORAGE MEDIA FOR COMPARING NON-ADJACENT DATA SUBSETS" filed Aug. 6, 2020 which claims priority to U.S. Provisional Application Ser. No. 62/883,405 entitled "Systems, Methods, Computing Platforms, And Storage Media For Comparing Data Sets Through Decomposing Data Into A Directed Acyclic Graph" and U.S. Provisional Application Ser. No. 62/883,403 entitled "Systems, Methods, Computing Platforms, And Storage Media For Comparing Non-Adjacent Data Subsets", both filed Aug. 6, 2019 and assigned to the assignee hereof and hereby expressly incorporated by reference herein.

FIELD OF THE DISCLOSURE

The present disclosure relates to data analytics systems and more particularly to systems, methods, computing platforms, and storage media for comparing and analyzing non-adjacent data subsets.

BACKGROUND

Current techniques for analyzing data subsets are lacking. In some cases, business intelligence tools are configured to display adjacent data subsets. For instance, a business intelligence tool may be used to display multiple charts pertaining to product sales on one or more screens, where each chart shows multiple adjacent sets of data or data subsets. Some tools may also be configured to display multiple adjacent data subsets using different colors (e.g., red for a first data subset, green for a second data subset) or using different chart configurations (e.g., bar chart, pie chart). While such charts may be displayed on the same screen, no aspects of such displays seek to compare non-adjacent data subsets. In fact, current techniques for analyzing non-adjacent data subsets are restricted to decision trees, where a hierarchy of splits in data are shown on a screen. In some cases, the splits in the data are all inter-related and shown only in a highly hierarchical way. Thus, there is a need for a refined system and process for not only analyzing, but also visualizing non-adjacent subsets that are not inter-related, and in non-hierarchical ways.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Data analysis is a process of "drilling into" data. For instance, data analysis comprises starting with a large set of data (i.e., the data universe) and progressively choosing aspects of the data to filter until arriving at smaller and smaller subsets. The decision to go from the universe (or a subset of the data universe) to a smaller subset may be achieved by looking at a variable and the various values of that variable, and the relation between a given metric (or a set of metrics) across the subsets of the data to the various values of that variable.

As an example, a merchant analyzing clothing sales may divide the data by clothing department (e.g., men's, women's, children, etc.). In some cases, the merchant may visualize the data using a bar chart, where the bar chart shows an average sales value for each department. The merchant may further "dig into" the data by viewing charts for color, size, price, etc., under each department. For instance, the merchant may choose to view a chart of sales value by color under "Women's Department". In some regards, one can represent the data subsets for clothing sales value by a vector, where more and more dimensions to the vector may be added as the merchant drills deeper into the data. For instance, the example above may be described using a vector [Department, Color], with the coordinates of a subset being [Women's, Red]. Thus, in some cases, two subsets may be considered to be adjacent if all their coordinates in the vector are identical, except one. As an example, the subset [Women's, Red] may be adjacent to the subsets [Men's, Red] and [Women's, Green]. However, according to this definition, the subsets [Men's, Red] and [Women's, Green] may not be adjacent to each other, since they differ in both coordinates.

In some circumstances, data analysis may involve displaying information related to adjacent data subsets via a user interface. The user interface may further be used to communicate the common coordinates of data subsets. In one example, data analysis may be used to display a sales value bar chart of Women's clothing broken down by color (i.e., a set of adjacent subsets), where each bar is labeled a different color (e.g., Red, Green, etc.).

Current techniques for data analysis are generally directed to analyzing and visualizing adjacent data subsets. In some cases, however, useful business insight may be gathered by analyzing and visualizing non-adjacent data subsets. Aspects disclosed herein relate to a system and process that is capable of analyzing data and identifying statistically significant patterns that highlight differences across subgroups, also referred to as subsets, of data. In some embodiments, a data analyst, a manager, a sales representative, etc., may utilize the statistics on the subsets of data and various criteria's for evaluating the subsets while making business decisions.

In some cases, the system and process of the present disclosure may be directed to utilizing one or more of unsupervised, semi-supervised, and supervised machine learning techniques to identify such patterns. In some cases, after discovering patterns that exist in data, the system may analyze each subgroup to evaluate performance with respect to key business metrics, as well as prioritize the patterns based on the evaluated performance of different subgroups or subsets of data. In some embodiments, the system may display the patterns of interest on a visual display via a user interface. Returning to the above example, in one instance, a first pattern displayed by the system may relate to "Women's, Red, Size=Large" while a second pattern may relate to "Department=Men's, Maker=Armani, Price>$500". In some cases, these two patterns may be associated with non-adjacent subsets.

One aspect of the present disclosure relates to a method for comparing non-adjacent data subsets. The method may include receiving an input data set, where the input data set includes information to be analyzed, generating at least one list of data subsets of the input data set, determining whether at least one data subset of the at least one list of data subsets contains a notable characteristic, identifying at least one data pattern in the at least one list of data subsets of the input data set, sorting data subsets of the at least one list of data subsets of the input data set, and displaying, via a user interface, the data subsets of the at least one list of data subsets, based on the sorting.

Still another aspect of the present disclosure relates to a system configured for comparing non-adjacent data subsets. The system may include means for receiving an input data set, where the input data set includes information to be analyzed, means for generating at least one list of data subsets of the input data set, means for determining whether at least one data subset of the at least one list of data subsets contains a notable characteristic, means for identifying at least one data pattern in the at least one list of data subsets of the input data set, means for sorting data subsets of the at least one list of data subsets of the input data set, and means for displaying, via a user interface, the data subsets of the at least one list of data subsets, based on the sorting.

Even another aspect of the present disclosure relates to a non-transient computer-readable storage medium having instructions embodied thereon, the instructions being executable by one or more processors to perform a method for comparing non-adjacent data subsets. The method may include receiving an input data set, where the input data set includes information to be analyzed, generating at least one list of data subsets of the input data set, determining whether at least one data subset of the at least one list of data subsets contains a notable characteristic, identifying at least one data pattern in the at least one list of data subsets of the input data set, sorting data subsets of the at least one list of data subsets of the input data set, and displaying, via a user interface, the data subsets of the at least one list of data subsets, based on the sorting.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
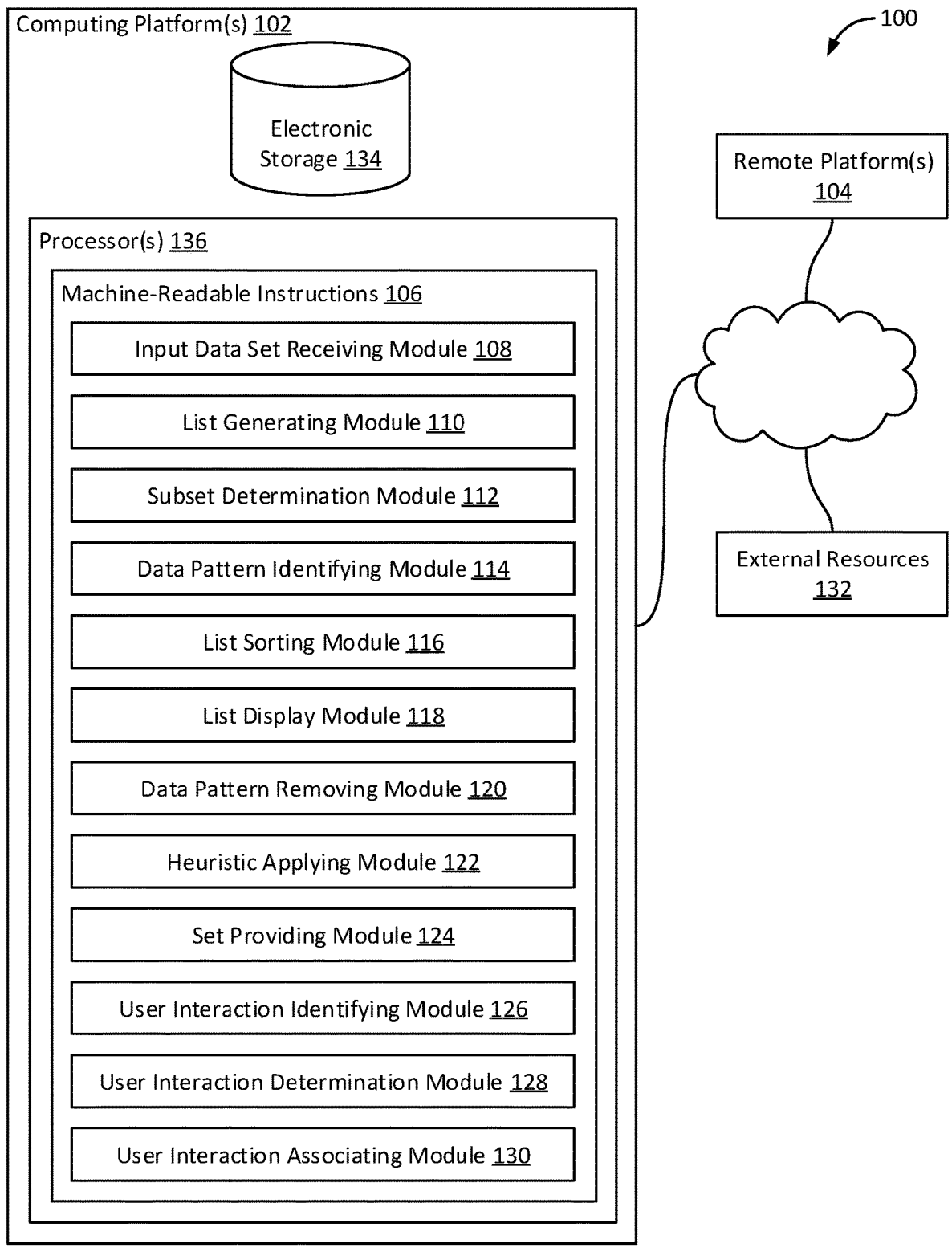
FIG. 1 illustrates a system configured for comparing non-adjacent data subsets, in accordance with one or more implementations.

Pattern recognition may refer to the process of recognizing patterns, regularities, and irregularities in data. Pattern recognition may have applications in numerous fields, including statistical data analysis, signal processing, machine learning, etc., to name a few non-limiting examples. One approach to pattern recognition may include the use of machine learning algorithms. The increased availability of big data and an abundance of computing power has facilitated the use of machine learning for pattern recognition. In some cases, pattern recognition systems may be trained from labeled "training" data, which may be referred to as supervised learning. In other cases, such as when no labeled data is utilized, one or more other algorithms may be used to discover previously unknown patterns, which may be referred to as unsupervised learning. While supervised learning techniques may allow data analysis for simple sets of data comprised of numerous rows but few attributes, it may be impractical for complex sets of data with many attributes generated, for instance, by large enterprises. In some cases, data may also span across multiple internal systems and silos, adding to the complexity of data analysis. In such cases, unsupervised learning techniques may optimize data analysis, since a data scientist or analyst may not need to tag and select the subset of data to include in the analysis.

In some cases, the input data for unsupervised learning may consist of a set of input vectors 'x' without any corresponding labels. Discovery of data groups comprising similar examples (i.e., finding hidden patterns in data), also referred to as clustering analysis, may be an example of an unsupervised learning method. In other cases, unsupervised learning may be directed to determining how data is distributed in space (i.e., the data universe), which may be referred to as density estimation.

Data analysis is a process of "drilling into" data and comprises starting with a large set of data (i.e., the data universe) and progressively choosing aspects of the data to filter until arriving at smaller and smaller subsets, and identifying relationships within the subsets. The decision to go from the universe (or a subset of the universe) to a smaller subset is achieved by looking at a variable and the various values of that variable, and the relation between a given metric (or a set of metrics) across the subsets of the data with the various values of that variable (i.e., either intrinsic to the data or derived from the data). In some regards, one can represent the data subsets by a vector of the criteria (or filters) that define the subset, where more and more dimensions to the vector are added as one drills down. In some cases, two subsets may be adjacent if all their coordinates in the vector are identical, save for one. In some circumstances, data analysis may involve displaying information about both adjacent and non-adjacent data subsets via a user interface.

The user interface may further be used to communicate the coordinates of data subsets, which may include common coordinates (i.e., for adjacent data subsets), as well as coordinates that differ (i.e., for both adjacent and non-adjacent data subsets).

Aspects of the disclosure are initially described in the context of a system configured for comparing non-adjacent data subsets. The described techniques relate to improved methods, systems, devices, or apparatuses that are capable of analyzing data and identifying statistically significant patterns in the data, which may in turn be used to highlight differences across subgroups of data. Generally, the described techniques provide for utilizing unsupervised learning techniques to identify such patterns, although semi-supervised and/or supervised machine learning techniques may be deployed, in some embodiments. Furthermore, the described techniques may provide for the system to analyze each subgroup to evaluate performance with respect to key business metrics, as well as prioritize the patterns based on the evaluated performance. In some embodiments, the system may also display the patterns of interest on a visual display via a user interface. Aspects of the disclosure are further illustrated by and described with reference to apparatus diagrams, systems diagrams, and flowcharts that relate to the comparison of non-adjacent data subsets.

For the purposes of this disclosure, the term "pattern" may relate to the associated statistics of a subset of data. One example of a pattern may be that men in Alaska spend two times the average of an input dataset. That is, if the statistics of a spend column in a subset (i.e., derived from an input dataset) that only includes records where "State=Alaska" and "Gender=Male" are both true are considered, the statistics of the spend column in the subset would be twice the average of the spend column for the whole input dataset. Furthermore, for the purposes of this disclosures, the terms "data subset", "segment", "subset", and "subgroup" may be used interchangeably through the application. Further, any references to the display of a subset to a user may be synonymous with a simplified representation of the subset or a display of the criteria (or filters) used to define the subset.

The words "for example" is used herein to mean "serving as an example, instance, or illustration." Any embodiment described herein as "for example" is not necessarily to be construed as preferred or advantageous over other embodiments.

The flowcharts and block diagrams in the following figures illustrate the architecture, functionality, and operation of possible implementations of devices, systems, methods, and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

FIG. 1 illustrates a system 100 configured for comparing non-adjacent data subsets, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of input data set receiving module 108, list generating module 110, subset determination module 112, data pattern identifying module 114, list sorting module 116, list display module 118, data subset removing module 120, heuristic applying module 122, set providing module 124, user interaction identifying module 126, user interaction determination module 128, user interaction associating module 130, and/or other instruction modules.

Input data set receiving module 108 may be configured to receive an input data set, where the input data set may include information to be analyzed. In some cases, the information may be at least one of numerical, alpha-numerical, categorical, string based, or character-based information.

List generating module 110 may be configured to generate at least one list of data subsets from the input data set. In some embodiments, list generating module 110 may also be configured to generate an additional list of data subsets based at least in part on a data pattern feedback characteristic and/or other user interest indicators on the subsets of the input data set or a similar data subset (e.g., derived from a different data set). In some examples, generating a list of subsets of the input data set may include determining if an adequate number of subsets (e.g., 5, 7, 10, etc.) can be identified from the input data set. Sorting the list of subsets of the input data set may include using an intrinsic heuristic or a derived heuristic as further input data. The intrinsic heuristic may be a size of a subset of the input data set as measured by a number of records, or an element of each record. In some cases, the intrinsic heuristic may be based on a complexity level of a criteria used to define a subset. In some cases, the derived heuristic may comprise a kernel density. Ultimately, the input data set may include information to be analyzed and displayed to a user of the system.

Subset determination module 112 may be configured to determine whether any of the subsets contain notable characteristics such as variance from average behaviors on size, key metrics, statistical measures such as kernel density (or kernel density estimation) or other such characteristics, etc. Kernel density estimation may refer to a non-parametric way for estimating the probability density function of a random variable. In some cases, kernel density estimation may be an example of a fundamental data smoothing problem where inferences about a population may be made based on a finite data sample. Additionally or alternatively, subset determination module 112 may be configured to determine whether at least one data subset of the at least one list of data subsets contains a characteristic that is notable when compared to a same characteristic for the input data set.

Data pattern identifying module 114 may be configured to identify at least one data pattern in the at least one list of data subsets of the input data set. As an example, an input data set may include clothing sales for a department store, where a first subset may be directed to red colored clothes of size large from the Women's Department (i.e., gender=Women's, Size=Large, Color=Red). Further, a second subset may be directed to green colored clothes of size large from the Men's Department (i.e., gender=Men's, Size=Large, Color=Green). In this case, the list of data subsets may include the first and second subsets. Further, the data patterns in the at least one list of data subsets of the input data may comprise statistics associated with the clothing sales for the first and second subsets.

In some embodiments, generating a list of subsets of the input data set may further include applying a heuristic to determine whether the at least one data subset and/or the data pattern includes a further notable characteristic. In some cases, a heuristic may refer to a problem-solving method that delivers approximate, but fairly accurate, solutions given a limited time frame or deadline. In some cases, a heuristic may be an example of a flexibility technique for quick decisions, for instance, when working with complex data. Thus, in some aspects, heuristic methods may assist with data complexity given limited time and/or resources. As an example, banks may utilize a heuristic approach to speed up analysis for online or mobile deposit of checks into a bank account.

List sorting module 116 may be configured to sort data subsets of the at least one list of data subsets of the input data set. In some cases, sorting the at least one list of data subsets may be based in part on identifying the at least one data pattern. In some embodiments, list display module 118 may be configured to display, via a user interface, the data subsets of the at least one list of data subsets, based on the sorting. In some cases, sorting data subsets may include assigning a score to each data subset and/or ranking data subsets with respect to each other. In some cases, the user interface may be an interactive user interface, and may comprise one or more data visualizations for the at least one data pattern, which may include a bar graph, a progress bar, a pie chart, a radar chart, a bubble chart, to name a few non-limiting examples. Furthermore, the interactive user interface may be configured to accept a user input action upon identifying a user interaction with at least one data subset of the list of data subsets, where the user input action may be received via an input device, such as a mouse, keyboard, microphone (i.e., if voice recognition is enabled), etc.

Data subset removing module 120 may be configured to remove the at least one data subset from the at least one list of data subsets upon determining that the at least one data subset does not include a notable characteristic. Additionally or alternatively, data subset removing module 120 may be configured to remove the at least one data pattern in the at least one list of data subsets upon determining that the at least one data pattern does not include any notable characteristics.

Heuristic applying module 122 may be configured to iteratively apply the heuristic to identify additional notable data subsets in the input data set.

Set providing module 124 may be configured to provide a set of criteria types along with the input data set. For example, criteria types may include one or more filters on the data. Some examples of filters may include a cell equaling a value, a cell containing a given value, a cell being in a given range, a cell mapping to another value being explored (e.g. a date may be used to derive if a given day falls on a weekend or a weekday, where the criteria is weekday), etc., to name a few non-limiting examples. The set of criteria types may be used to further identify the at least one data pattern in the at least one list of subsets of the input data set. Identifying at least one data pattern in the subsets of the input data set may be completed using one or more of unsupervised, semi-supervised, and supervised machine learning techniques. Additionally or alternatively, identifying at least one data pattern in the subsets of the input data may be completed by using feedback from a user, which may be based on a user's interaction with a data subset, where the user interaction may be linked to a user input action received via an input device (e.g., mouse, keyboard, etc.). It should be noted that the user interaction may refer to an interaction performed by the same user or a different user of the system.

User interaction identifying module 126 may be configured to identify a user interaction with at least one subset from the list of subsets of the input data set. In some cases, user interaction identifying module 126 may be configured to identify a user interaction with the at least one list of data subsets of the input data set. Examples of user interactions may include clicking on a subset in a list of subsets, viewing a page detailing the subset for at least a threshold period of time (e.g., seconds, 1 minute, 5 minutes, etc.), assigning the subset or a statistic of the subset to another person in a workflow, assigning the subset or a statistic of the subset to a given user, commenting on a subset, adding a subset to a favorites list, or other similar actions. As noted above, system 100 may comprise an interactive user interface configured to accept one or more user input actions, where the user input actions are based on identifying user interactions with at least one data subset of the list of data subsets. The interactive user interface may also be used to display data visualizations associated with the list of data subsets and/or data patterns.

User interaction determination module 128 may be configured to determine whether the user interaction is indicative of interest in at least one data subset. Furthermore, user interaction associating module 130 may be configured to associate the user interaction with a data pattern feedback characteristic.

In some implementations, sorting the list of subsets of the input data set may be based at least in part on a user's previous interactions with a similar subset, where the user's previous interaction may be utilized as further input data. It should be noted that the previous interaction may be performed by the same user or a different user of the system. In some implementations, sorting the list of subsets of the input data set may include using at least one business metric as further input data. In some implementations, an interaction used for heuristics may be based on a user performing an action like clicking on subsets rendering in a user interface to get more information on the subsets. Another implementation may involve adding the subset to a list of subsets for further investigation. In some embodiments, a user interaction may serve as a signal, and heuristics may be used to translate one or more user interaction signals into a set of decisions related to the inclusion of subsets, sorting of subsets, etc.

In some implementations, server(s) 102, client computing platform(s) 104, and/or external resources 132 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 132 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 132, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 132 may include sources of information outside of system 100, external entities participating with system 100, and/or other resources. In some implementations, some or all of the functionality attributed herein to external resources 132 may be provided by resources included in system 100.

Server(s) 102 may include electronic storage 134, one or more processors 136, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 134 may comprise non-transitory storage media that electronically stores information. The electronic storage media of electronic storage 134 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 134 may include one or more virtual storage resources (e.g., cloud storage, a virtual private network, and/or other virtual storage resources). Electronic storage 134 may store software algorithms, information determined by processor(s) 136, information received from server(s) 102, information received from client computing platform(s) 104, and/or other information that enables server(s) 102 to function as described herein.

Processor(s) 136 may be configured to provide information processing capabilities in server(s) 102. As such, processor(s) 136 may include one or more of a digital processor, an analog processor, a digital circuit designed to process information, an analog circuit designed to process information, a state machine, and/or other mechanisms for electronically processing information. Although processor(s) 136 is shown in FIG. 1 as a single entity, this is for illustrative purposes only. In some implementations, processor(s) 136 may include a plurality of processing units. These processing units may be physically located within the same device, or processor(s) 136 may represent processing functionality of a plurality of devices operating in coordination. Processor(s) 136 may be configured to execute modules 108, 110, 112, 114, 116, 118, 120, 122, 124, 126, 128, and/or 130, and/or other modules. Processor(s) 136 may be configured to execute modules 108, 110, 112, 114, 116, 118, 120, 122, 124, 126, 128, and/or 130, and/or other modules by software; hardware; firmware; some combination of software, hardware, and/or firmware; and/or other mechanisms for configuring processing capabilities on processor(s) 136. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, 122, 124, 126, 128, and/or 130 are illustrated in FIG. 1 as being implemented within a single processing unit, in implementations in which processor(s) 136 includes multiple processing units, one or more of modules 108, 110, 112, 114, 116, 118, 120, 122, 124, 126, 128, and/or 130 may be implemented remotely from the other modules. The description of the functionality provided by the different modules 108, 110, 112, 114, 116, 118, 120, 122, 124, 126, 128, and/or 130 described below is for illustrative purposes, and is not intended to be limiting, as any of modules 108, 110, 112, 114, 116, 118, 120, 122, 124, 126, 128, and/or 130 may provide more or less functionality than is described. For example, one or more of modules 108, 110, 112, 114, 116, 118, 120, 122, 124, 126, 128, and/or 130 may be eliminated, and some or all of its functionality may be provided by other ones of modules 108, 110, 112, 114, 116, 118, 120, 122, 124, 126, 128, and/or 130. As another example, processor(s) 136 may be configured to execute one or more additional modules that may perform some or all of the functionality attributed below to one of modules 108, 110, 112, 114, 116, 118, 120, 122, 124, 126, 128, and/or 130.

FIGS. 2A, 2B, 2C, 2D, and/or 2E illustrate a method 200 for comparing non-adjacent data subsets, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIGS. 2A, 2B, 2C, 2D, and/or 2E and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

Figure 2A:
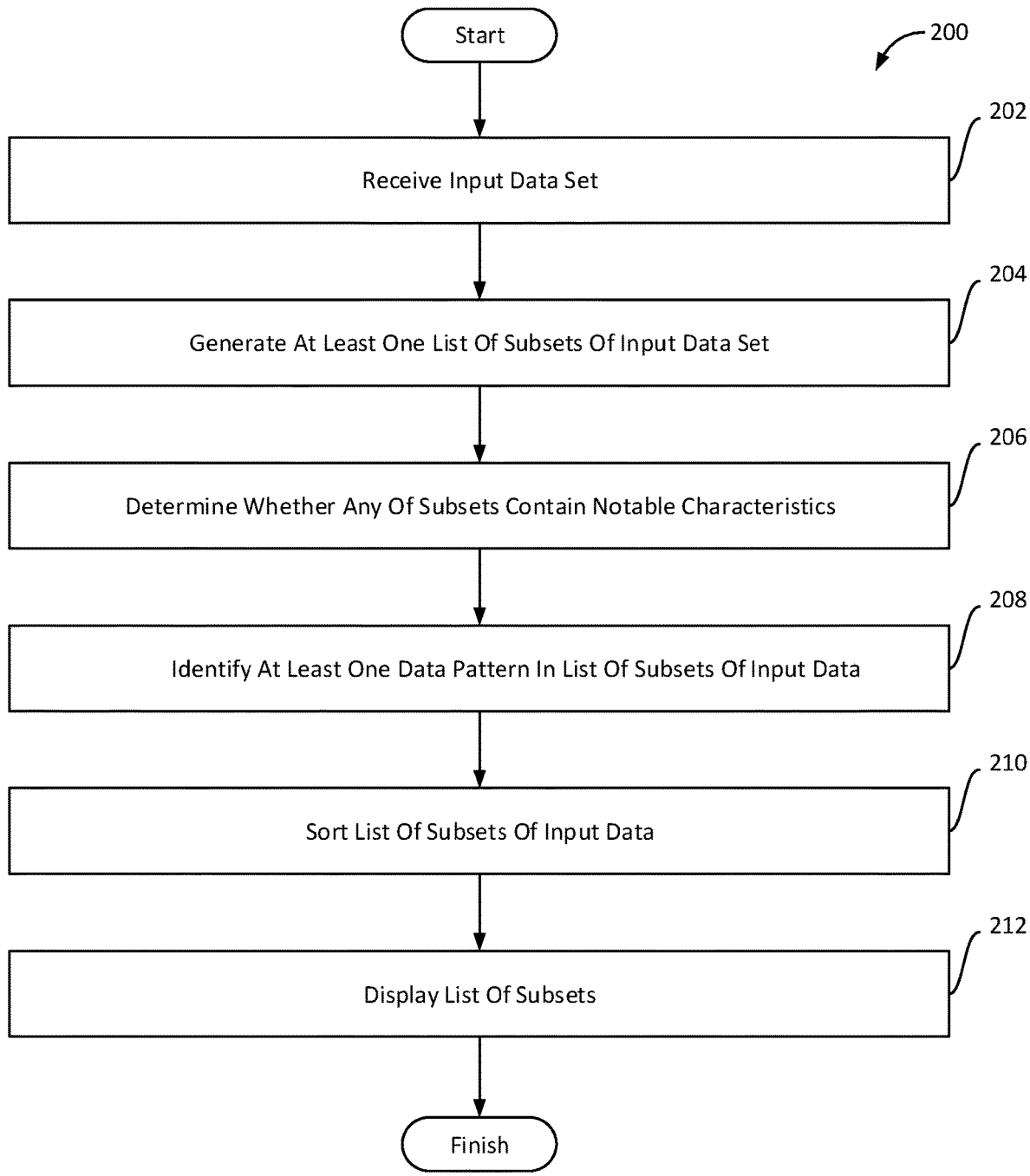
FIGS. 2A, 2B, 2C, 2D, and/or 2E illustrate a method for comparing non-adjacent data subsets, in accordance with one or more implementations.

FIG. 2A illustrates method 200, in accordance with one or more implementations.

An operation 202 may include receiving an input data set. The input data set may include information to be analyzed. Operation 202 may be performed by one or more hardware processors configured by machine-readable instructions including a module that is the same as or similar to input data set receiving module 108, in accordance with one or more implementations.

An operation 204 may include generating at least one list of data subsets of the input data set. Operation 204 may be performed by one or more hardware processors configured by machine-readable instructions including a module that is the same as or similar to list generating module 110, in accordance with one or more implementations.

An operation 206 may include determining whether at least one data subset of the at least one list of data subsets contains at least one notable characteristic. Operation 206 may be performed by one or more hardware processors configured by machine-readable instructions including a module that is the same as or similar to subset determination module 112, in accordance with one or more implementations.

An operation 208 may include identifying at least one data pattern in the at least one list of data subsets of the input data set. Operation 208 may be performed by one or more hardware processors configured by machine-readable instructions including a module that is the same as, or similar to data pattern identifying module 114, in accordance with one or more implementations. The term "pattern" as used herein can be attributed to any type of statistical or other data analysis result oriented process to identify a subset of an input data set.

An operation 210 may include sorting data subsets of the at least one list of data subsets of the input data set. Operation 210 may be performed by one or more hardware processors configured by machine-readable instructions including a module that is the same as, or similar to list sorting module 116, in accordance with one or more implementations.

An operation 212 may include displaying, via a user interface, the data subsets of the at least one list of data subsets, based on the sorting. In some examples, the user interface may be an interactive user interface. Further, the interactive user interface may comprise one or more data visualizations for the at least one data pattern. In some embodiments, the interactive user interface may be configured to accept a user input action based on identifying a user interaction with at least one data subset of the list of data subsets. Operation 212 may be performed by one or more hardware processors configured by machine-readable instructions including a module that is the same as, or similar to list display module 118, in accordance with one or more implementations.

Figure 2B:
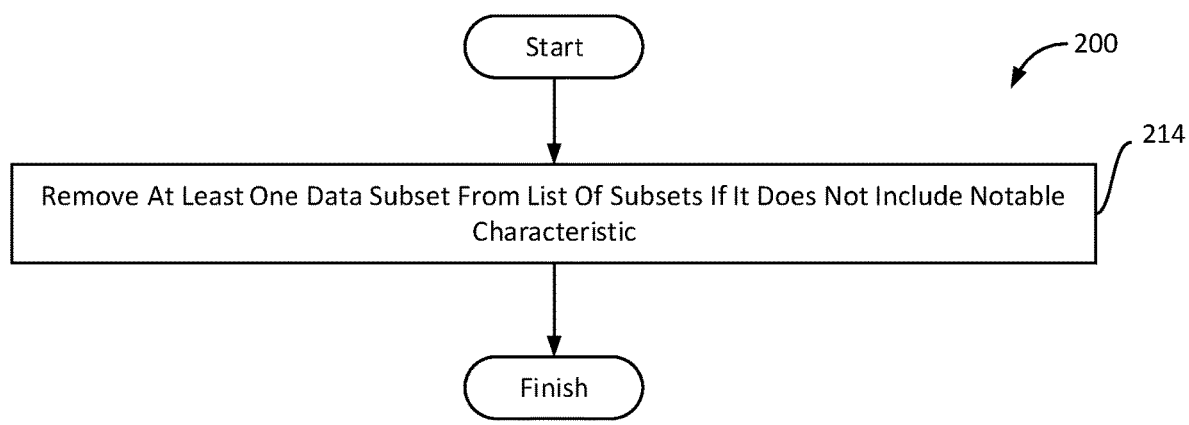

FIG. 2B illustrates method 200, in accordance with one or more implementations. In FIG. 2B, an operation 214 may include further removing the at least one data subset from the at least one list of data subsets, for instance, upon determining that the at least one data subset does not include a notable characteristic. Operation 214 may be performed by one or more hardware processors configured by machine-readable instructions including a module that is the same as, or similar to data subset removing module 120, in accordance with one or more implementations.

Figure 2C:
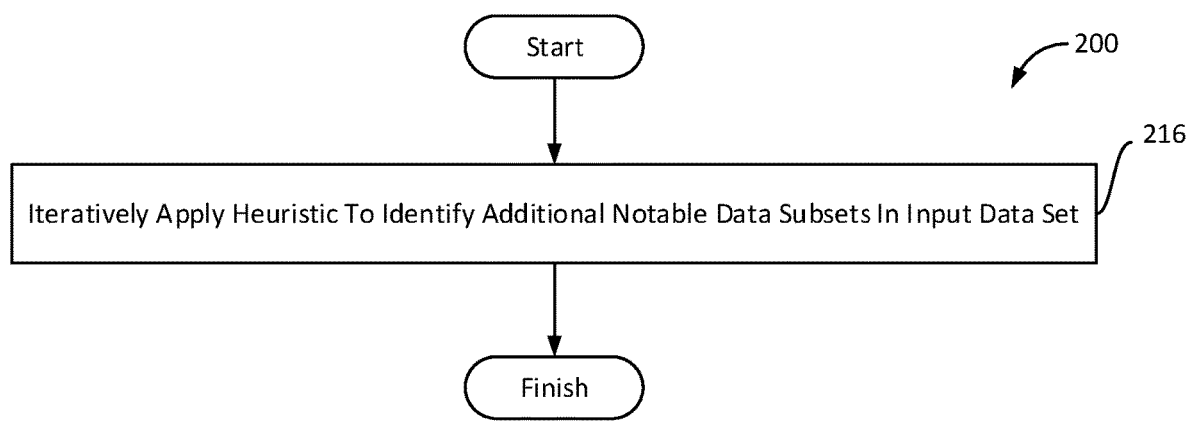

FIG. 2C illustrates method 200, in accordance with one or more implementations. In FIG. 2C, an operation 216 may include iteratively applying the heuristic to identify additional notable subsets (i.e., subsets and/or data patterns comprising notable characteristics) in the input data set. For example, a data subset and its associated data pattern may be directed to male customers in Utah. Further, the system of the present disclosure may have classified this data subset and associated data pattern as interesting (i.e., comprising notable characteristics). In this case, operation 216 may include finding more subsets with notable characteristics. For instance, the system may dig in further and find that there are additional subsets of the data subset or the input data set that are also interesting. In one example, the system may deduce that males in Utah that own Audi's and live more than 5 miles from a store are even more interesting (e.g., comprise notable characteristics that are even more significant in nature) than just males in Utah.

Operation 216 may be performed by one or more hardware processors configured by machine-readable instructions including a module that is the same as or similar to heuristic applying module 122, in accordance with one or more implementations.

Figure 2D:
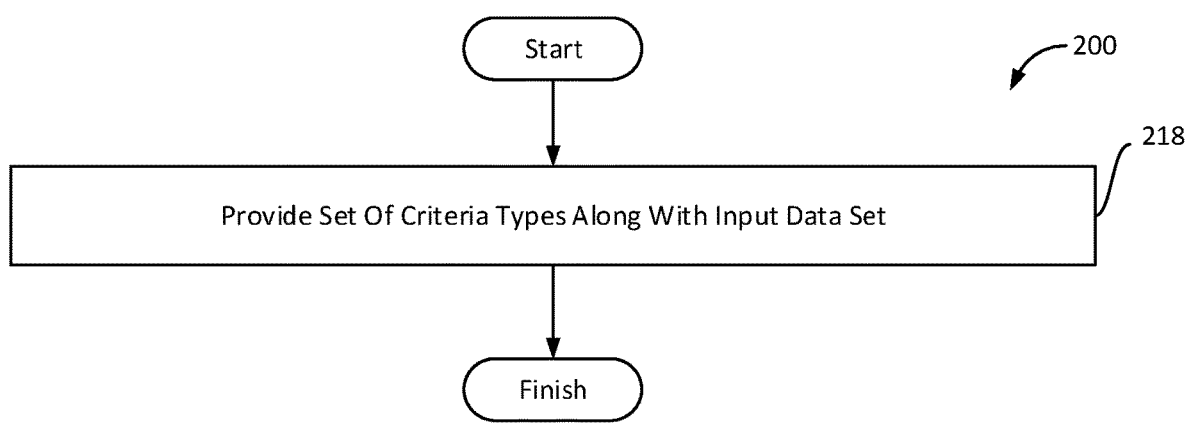

FIG. 2D illustrates method 200, in accordance with one or more implementations. In FIG. 2D, an operation 218 may further include providing a set of criteria types along with the input data set. Operation 218 may be performed by one or more hardware processors configured by machine-readable instructions including a module that is the same as or similar to set providing module 124, in accordance with one or more implementations.

Figure 2E:
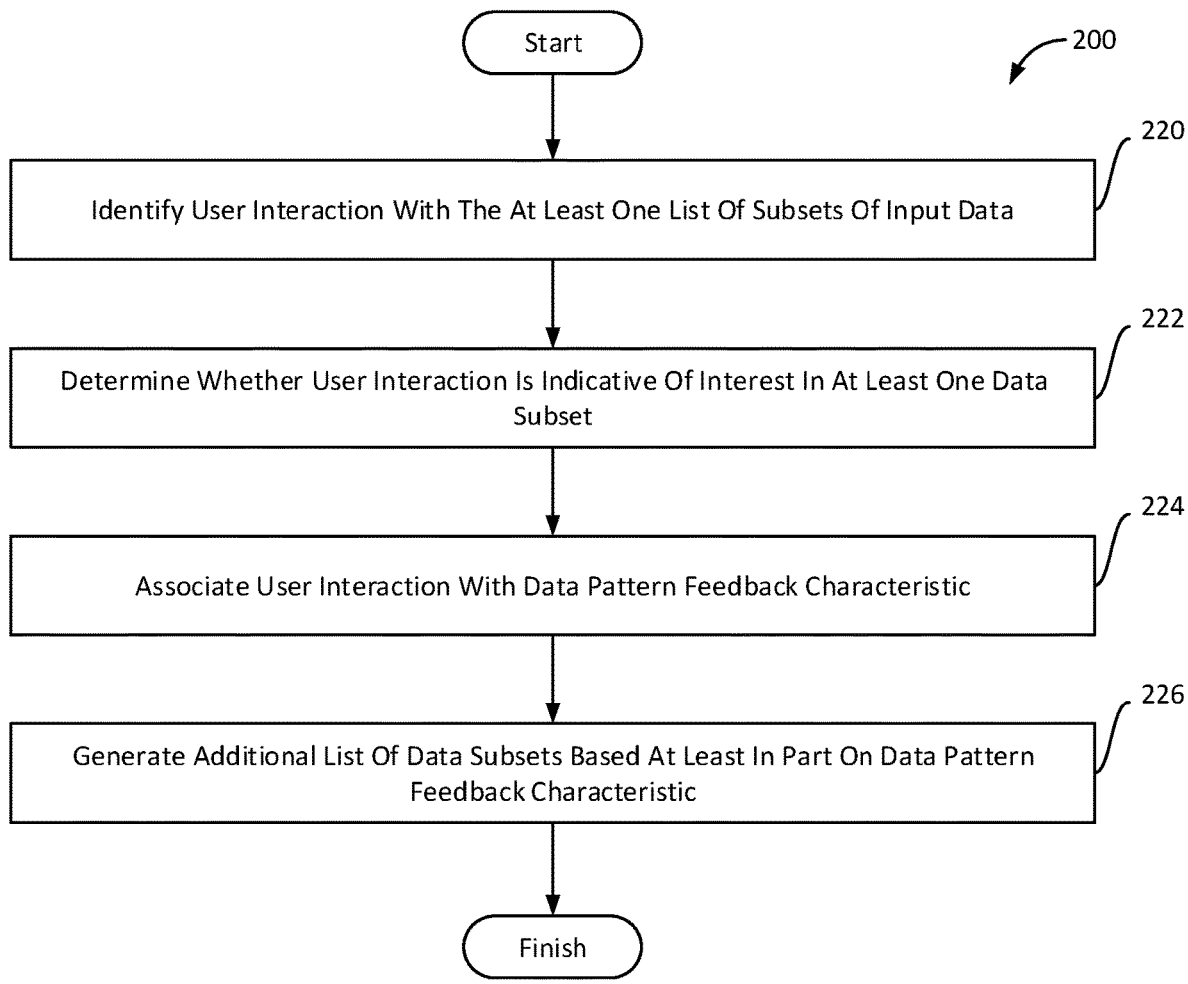

FIG. 2E illustrates method 200, in accordance with one or more implementations. In FIG. 2E, an operation 220 may include identifying a user interaction with the at least one list of data subsets of the input data set. In some cases, the system may comprise an interactive user interface configured to accept a user input action based on identifying the user interaction with at least one data subset of the list of data subsets. Operation 220 may be performed by one or more hardware processors configured by machine-readable instructions including a module that is the same as or similar to user interaction identifying module 126, in accordance with one or more implementations.

An operation 222 may include determining whether the user interaction is indicative of interest in at least one data subset of the at least one list of data subsets of the input data set. Operation 222 may be performed by one or more hardware processors configured by machine-readable instructions including a module that is the same as or similar to user interaction determination module 128, in accordance with one or more implementations.

An operation 224 may include associating the user interaction with a data pattern feedback characteristic. Operation 224 may be performed by one or more hardware processors configured by machine-readable instructions including a module that is the same as or similar to user interaction associating module 130, in accordance with one or more implementations.

An operation 226 may include generating an additional list of data subsets based at least in part on the data pattern feedback characteristic. Operation 226 may be performed by one or more hardware processors configured by machine-readable instructions including a module that is the same as or similar to list generating module 110, in accordance with one or more implementations.

Figure 3:
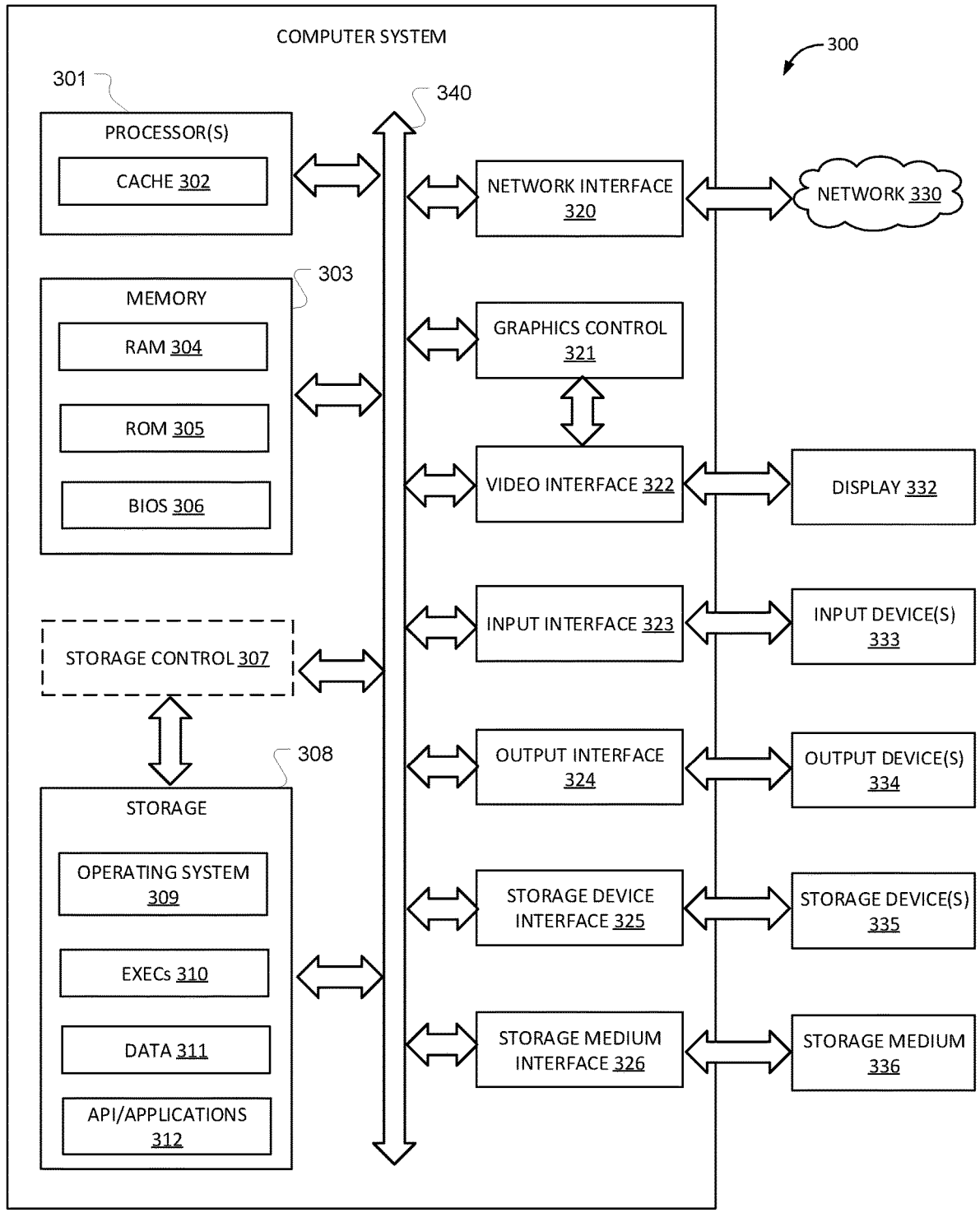
FIG. 3 is a block diagram depicting an exemplary machine that includes a computer system within which a set of instructions can be executed for causing a device to perform or execute any one or more of the aspects and/or methodologies of the present disclosure.

Referring to FIG. 3, it is a block diagram depicting an exemplary machine that includes a computer system 300 within which a set of instructions can execute for causing a device to perform or execute any one or more of the aspects and/or methodologies of the present disclosure. The components in FIG. 3 are examples only and do not limit the scope of use or functionality of any hardware, software, embedded logic component, or a combination of two or more such components implementing particular embodiments.

Computer system 300 may include a processor 301, a memory 303, and a storage 308 that communicate with each other, and with other components, via a bus 340. The bus 340 may also link a display 332, one or more input devices 333 (which may, for example, include a keypad, a keyboard, a mouse, a stylus, etc.), one or more output devices 334, one or more storage devices 335, and various tangible storage media 336. All of these elements may interface directly or via one or more interfaces or adaptors to the bus 340. For instance, the various tangible storage media 336 can interface with the bus 340 via storage medium interface 326. Computer system 300 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 301 (or central processing unit(s) (CPU(s))) optionally contains a cache memory unit 302 for temporary local storage of instructions, data, or computer addresses. Processor(s) 301 are configured to assist in execution of computer readable instructions. Computer system 300 may provide functionality for the components depicted in FIGS. 1-2E as a result of the processor(s) 301 executing non-transitory, processor-executable instructions embodied in one or more tangible computer-readable storage media, such as memory 303, storage 308, storage devices 335, and/or storage medium 336. The computer-readable media may store software that implements particular embodiments, and processor(s) 301 may execute the software. Memory 303 may read the software from one or more other computer-readable media (such as mass storage device(s) 335, 336) or from one or more other sources through a suitable interface, such as network interface 320. The software may cause processor(s) 301 to carry out one or more processes or one or more steps of one or more processes described or illustrated herein. Carrying out such processes or steps may include defining data structures stored in memory 303 and modifying the data structures as directed by the software.

The memory 303 may include various components (e.g., machine readable media) including, but not limited to, a random-access memory component (e.g., RAM 304) (e.g., a static RAM "SRAM", a dynamic RAM "DRAM, etc.), a read-only component (e.g., ROM 305), and any combinations thereof. ROM 305 may act to communicate data and instructions unidirectionally to processor(s) 301, and RAM 304 may act to communicate data and instructions bidirectionally with processor(s) 301. ROM 305 and RAM 304 may include any suitable tangible computer-readable media described below. In one example, a basic input/output system 306 (BIOS), including basic routines that help to transfer information between elements within computer system 300, such as during start-up, may be stored in the memory 303.

Fixed storage 308 is connected bidirectionally to processor(s) 301, optionally through storage control unit 307. Fixed storage 308 provides additional data storage capacity and may also include any suitable tangible computer-readable media described herein. Storage 308 may be used to store operating system 309, EXECs 310 (executables), data 311, API applications 312 (application programs), and the like. Often, although not always, storage 308 is a secondary storage medium (such as a hard disk) that is slower than primary storage (e.g., memory 303). Storage 308 can also include an optical disk drive, a solid-state memory device (e.g., flash-based systems), or a combination of any of the above. Information in storage 308 may, in appropriate cases, be incorporated as virtual memory in memory 303.

In one example, storage device(s) 335 may be removably interfaced with computer system 300 (e.g., via an external port connector (not shown)) via a storage device interface 325. Particularly, storage device(s) 335 and an associated machine-readable medium may provide nonvolatile and/or volatile storage of machine-readable instructions, data structures, program modules, and/or other data for the computer system 300. In one example, software may reside, completely or partially, within a machine-readable medium on storage device(s) 335. In another example, software may reside, completely or partially, within processor(s) 301.

Bus 340 connects a wide variety of subsystems. Herein, reference to a bus 340 may encompass one or more digital signal lines serving a common function, where appropriate. Bus 340 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 300 may also include an input device 333. In one example, a user of computer system 300 may enter commands and/or other information into computer system 300 via input device(s) 333. Examples of an input device(s) 333 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 333 may be interfaced to bus 340 via any of a variety of input interfaces 323 (e.g., input interface 323) including, but not limited to, serial, parallel, game port, USB, FIREWIRE, THUNDERBOLT, or any combination of the above.

In particular embodiments, when computer system 300 is connected to network 330, computer system 300 may communicate with other devices, specifically mobile devices and enterprise systems, connected to network 330. Communications to and from computer system 300 may be sent through network interface 320. For example, network interface 320 may receive incoming communications (such as requests or responses from other devices) in the form of one or more packets (such as Internet Protocol (IP) packets) from network 330, and computer system 300 may store the incoming communications in memory 303 for processing. Computer system 300 may similarly store outgoing communications (such as requests or responses to other devices) in the form of one or more packets in memory 303 and communicated to network 330 from network interface 320. Processor(s) 301 may access these communication packets stored in memory 303 for processing.

Examples of the network interface 320 include, but are not limited to, a network interface card, a modem, and any combination thereof. Examples of a network 330 or network segment 330 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 330, may employ a wired and/or a wireless mode of communication. In general, any network topology may be used.

Information and data can be displayed through a display 332. Examples of a display 332 include, but are not limited to, a liquid crystal display (LCD), an organic liquid crystal display (OLED), a cathode ray tube (CRT), a plasma display, and any combinations thereof. The display 332 can interface to the processor(s) 301, memory 303, and fixed storage 308, as well as other devices, such as input device(s) 333, via the bus 340. The display 332 is linked to the bus 340 via a video interface 322, and transport of data between the display 332 and the bus 340 can be controlled via the graphics control 321.

In addition to a display 332, computer system 300 may include one or more other peripheral output devices 334 including, but not limited to, an audio speaker, a printer, and any combinations thereof. Such peripheral output devices may be connected to the bus 340 via an output interface 324. Examples of an output interface 324 include, but are not limited to, a serial port, a parallel connection, a USB port, a FIREWIRE port, a THUNDERBOLT port, and any combinations thereof.

In addition, or as an alternative, computer system 300 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Figure 4A:
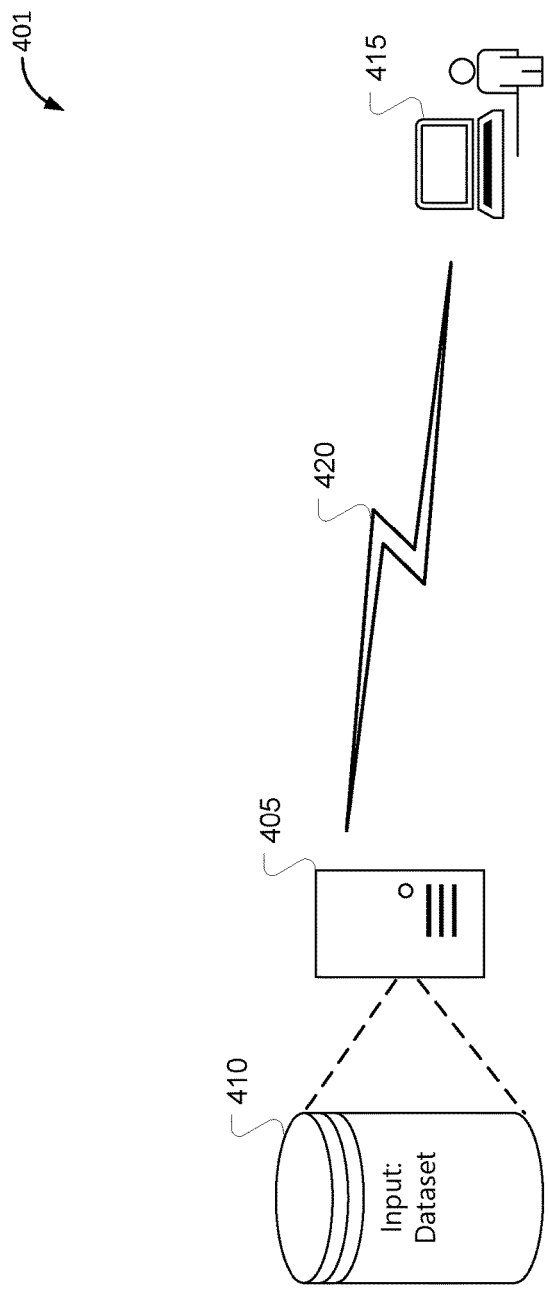
FIG. 4A illustrates a system diagram in accordance with one or more implementations.

FIG. 4A illustrates a system 400 configured for comparing non-adjacent data subsets in accordance with various aspects of the present disclosure. The system 400 may implement one or more aspects of system 100, and may include a server 405 and a user device 415. The user device 415 may be an example of a computing device, such as a computer, a laptop, a net book, a mobile phone, a tablet, to name a few non-limiting examples. In some embodiments, the user device 415 may comprise a visual display for displaying information to a user via a user interface, such as an interactive user interface. Further, the user device 415 may be configured to receive input from a user via a mouse, a keyboard, a microphone (i.e., voice recognition), etc. In some embodiments, the server 405 may also be an example of a computing device and may receive input from a data store or a plurality of databases. For instance, the server 405 may receive a dataset 410 as an input from a data store installed at an enterprise. In some other cases, the server 405 may receive data inputs from multiple internal systems, such as different departments, silos, or business functions of an enterprise. In some cases, the server 405 and user device 415 may be configured to communicate over a communication link 420, which may be an example of a wired or wireless communication link (e.g., Wi-Fi, mobile or cellular communications, such as 3G, 4G, 5G, etc.).

Generally, the server 405 receives a large amount of data (i.e., the data universe) as input, then chooses aspects of the data to progressively filter until it arrives at smaller subsets.

In some cases, the data may comprise numerical information, alpha-numerical information, or any other type of relevant information for analyzing. In some cases, a data subset may be described by a vector, where additional dimensions may be added to the vector as additional subsets are analyzed (i.e., drilling into data). As an example, and with reference to clothing sales at a department store, a merchant may choose to divide sales data by the department (e.g., men's, women's, children, etc.). In this case, [Department, Color] may be an example of a vector, with the coordinates of a subset being [Women's, Red]. It should be noted that, in this example, the data subset may be directed to the sales for red colored clothes from the women's department. Further, a data pattern may include the associated statistics for that data subset.

In some cases, adjacent subsets may refer to two subsets that share all identical coordinates in the vector, except for one. Accordingly, the subset [Women's, Red] may be adjacent to both [Men's, Red] and [Women's, Green]. Current techniques for data analysis are often restricted to comparing adjacent data subsets (e.g., a bar chart for clothing sales from the Women's Department may include a bar labeled for each color—Red, Green, etc.). As previously described, in some cases, data analysis may be enhanced by display of multiple sub-groups of data that are not adjacent to each other. For instance, display of non-adjacent subsets or patterns may include displaying a bar chart for the non-adjacent subsets [Men's, Red] and [Women's, Green]. In some cases, [Men's, Red] and [Women's, Green] may be referred to as non-adjacent subsets since they do not have any common coordinates.

In some cases, the server 405 may be configured to not only discover the myriad sub-groups of data that are interesting (e.g., comprise notable characteristics) within a larger data set, but also display those patterns via a screen of the user device 415. For example, one such pattern may comprise the statistics for the subset [Women's, Red, Size=Large]. Further, another example of a pattern may include the statistics for the subset [Men's, Maker=Armani, Price>$500]. In some embodiments, display of patterns related to non-adjacent subsets may provide users with crucial insight for making business decisions.

Figure 4B:
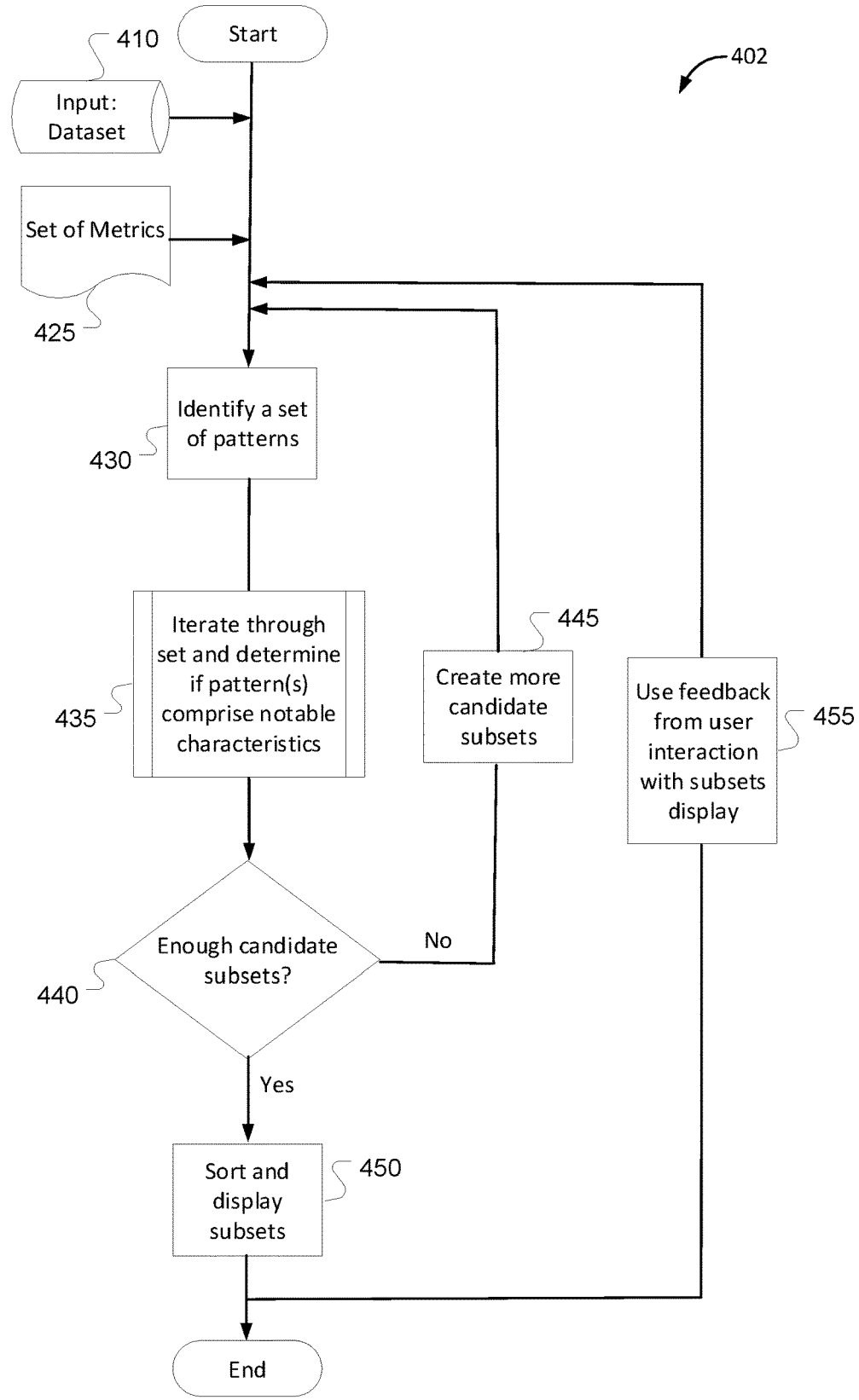
FIGS. 4B and 4C illustrate a process flow for the system diagram in FIG. 4A in accordance with one or more implementations.

FIG. 4B illustrates a system level process flow 401 that depicts various aspects of the embodiments described and claimed herein. In some cases, process flow 401 may implement one or more aspects of systems 100 and/or 400 as described in relation to FIGS. 1 and 4, respectively. As shown, process flow 401 may include input dataset 410. Process flow 401 may optionally include a set of metrics 425, which may be used to evaluate if a pattern from a set of patterns is interesting (i.e., includes notable characteristics).

At 430, system 400 may identify a set of patterns. In some cases, the set of patterns may include one or more candidate data patterns comprising notable characteristics. In some embodiments, a data pattern may be associated with a subset of the input data set. For instance, system 400 may first generate a plurality of subsets, also referred to as a list of subsets, from the input data set. Next, the system 400 may identify data patterns associated with one or more subsets of the plurality of the subsets. In some embodiments, the system 400 may utilize unsupervised machine learning techniques for finding candidate subsets and their associated patterns. In some other cases, the system 400 may utilize one or more of supervised machine learning and semi-supervised machine learning for identifying the set of patterns from the dataset. It should be noted that, the system may be configured to use any or all of the different machine learning techniques while identifying patterns. Additionally or alternatively, the system 400 may also utilize feedback from operators or users regarding preferred columns upon which to divide data. As an example, in some settings, it may be more intuitive for a user or operator to act on price-related patterns. Accordingly, the user or operator may indicate price as a preferred column for dividing data. In such cases, the system may include price as one of the columns while generating subsets. As noted above, a pattern may be defined as the statistics associated with a subset of data.

In some embodiments, the system 400 may utilize the set of metrics 425 to evaluate if a subset of data and its associated pattern comprises notable characteristics. In some examples, the system 400 may assign a score related to how notable a data pattern is with respect to other patterns. As an example, if an average value for a first subset of data is 20% higher than the average value for an input data set, it may be classified as notable (or not) depending on the number of other subsets that have higher average values. For instance, if 200 other subsets of the input data set comprise average values that are at least 50% higher than the input data set, the first subset may not be classified as comprising a notable characteristic.

In some embodiments, the set of metrics 425 may be provided by a human user of the system, such as a data analyst, manager, sales representative, etc. In other cases, the set of metrics 425 may be provided via an artificial intelligence or machine learning algorithm. Some examples of metrics include innate attributes of the data, such as a transaction amount, a loan default rate, transaction completion rate, employment offer acceptance rate, etc. Additionally or alternatively, the set of metrics 425 may include derived metrics, such as the average of a metric (e.g., transaction amount) across a group, the standard deviation of a metric, or the kernel density of the records in a group. In some cases, the set of metrics 425 may comprise one or more business metrics, such as campaign and program statistics, which may be examples of marketing and social media metrics, or new opportunities and leads, which may be examples of sales performance metrics, or financial metrics, to name a few non-limiting examples. Additionally or alternatively, metrics 425 may also include one or more of web traffic sources, incremental sales, social sentiment, sales growth, average profit margin, average purchase value, product performance, etc.

In some embodiments, the system 400 may determine if a subset and/or associated pattern contains notable characteristics, such as variance from other subsets on size, key metrics, etc. Further, notable characteristics may also depend upon statistical measures such as kernel density estimation, as previously described in FIG. 1.

Figure 4C:
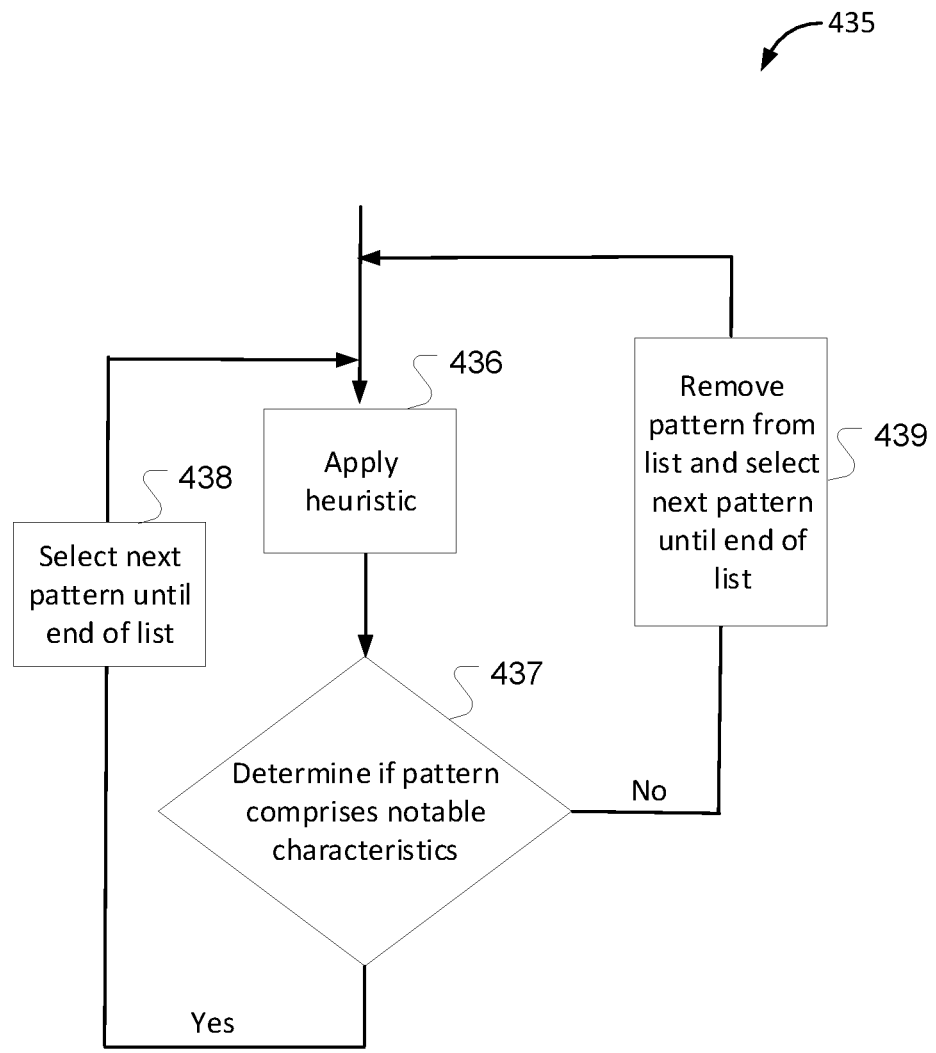

At 435, the system 400 may iterate through the set of identified patterns and determine if one or more of the patterns comprise notable characteristics, further described in FIG. 4C. After iterating through the patterns, at 440, the system 400 checks if enough candidate subsets and/or patterns have been identified from the input dataset 410. If no, the system 400 creates or identifies more candidate subsets from the input dataset 410 at 445. In some embodiments, the system 400 identifies an additional set of patterns associated with the subsets created at 445, and determines if one or more of those patterns comprise notable characteristics.

After the system 400 has deduced that it has enough candidate subsets (e.g., the number of identified candidate subsets exceeds a threshold or the number of records described by the subsets include the majority of input data records), the system 400 proceeds to sort and display the list of subsets and/or patterns comprising notable characteristics on the user device (e.g., user device 415 in FIG. 4A) at 450. In some embodiments, at 455, the system 400 may utilize feedback from user interaction with the subsets display, for instance, to refine its sorting capability. In other words, the system 400 may utilize a user's previous interactions with similar subsets as an input for sorting the current list of subsets, where the user may be the same or a different user. Additionally or alternatively, the system 400 may be configured to use business metrics as an input for sorting the list of subsets. In yet other cases, the system 400 may be configured to use intrinsic heuristics, such as the size of the patterns, or the complexity of the criteria for the various subsets, as an input for sorting the list of subsets. Additionally or alternatively, the system 400 may be configured to use derived heuristics, such as a kernel density, as an input for sorting the list of subsets.

FIG. 4C illustrates process flow 435, as previously shown in FIG. 4B, in further detail. In some cases, process flow 435 may implement one or more aspects of systems 100 and/or 400 as described in relation to FIGS. 1 and 4A, respectively. Further, process flow 435 implements one or more aspects of process flow 401 as described in relation to FIG. 4B.

As illustrated, after identifying a set of patterns (i.e., 430 in FIG. 4B), the system 400 may iterate through the set of identified patterns for determining if one or more of them comprise notable characteristics. In one embodiment, the system 400 may apply a heuristic at 436 to a first pattern from the list. At 437, the system 400 may determine if the first pattern comprises a notable characteristic. If yes, the system 400 proceeds to select a next pattern from the list, and repeats 436 and 437. If no, the system 400 removes the first pattern from the list and selects the next pattern at 439. The system 400 may be configured to repeat 436 and 437, and one of 438 or 439 until it reaches the end of the list or set of identified patterns. In some embodiments, once the system 400 has evaluated each pattern from the list and removed patterns that do not comprise at least one notable characteristic, the system 400 may arrive at a shorter version of the original list (i.e., a portion of patterns from the set of identified patterns), which may be sorted and then displayed to the user.

FIGS. 5-11 illustrate exemplary user interfaces 500-1100 used in conjunction with the various embodiments described herein. In some cases, user interfaces 500-1100 may implement one or more aspects of systems 100 and/or 400 described in relation to FIGS. 1 and 4A. Furthermore, user interfaces 500-1100 may also implement one or more aspects of process flows 401 and 435 described in relation to FIGS. 4B and 4C, and other figures described herein.

Figure 5:
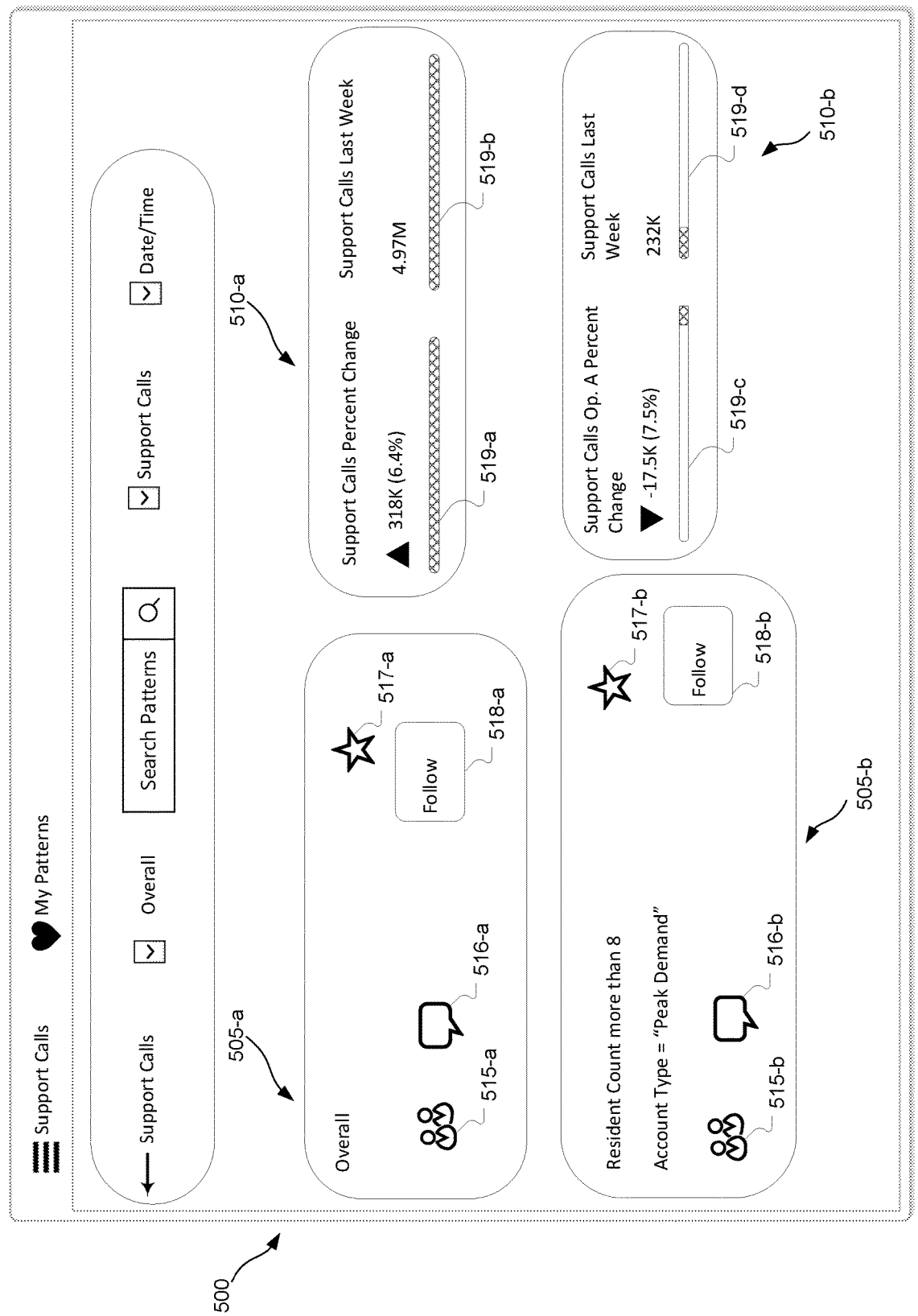
FIGS. 5-11 illustrate exemplary screen shots of a user interface designed to implement various aspects as disclosed herein.
Figure 6:
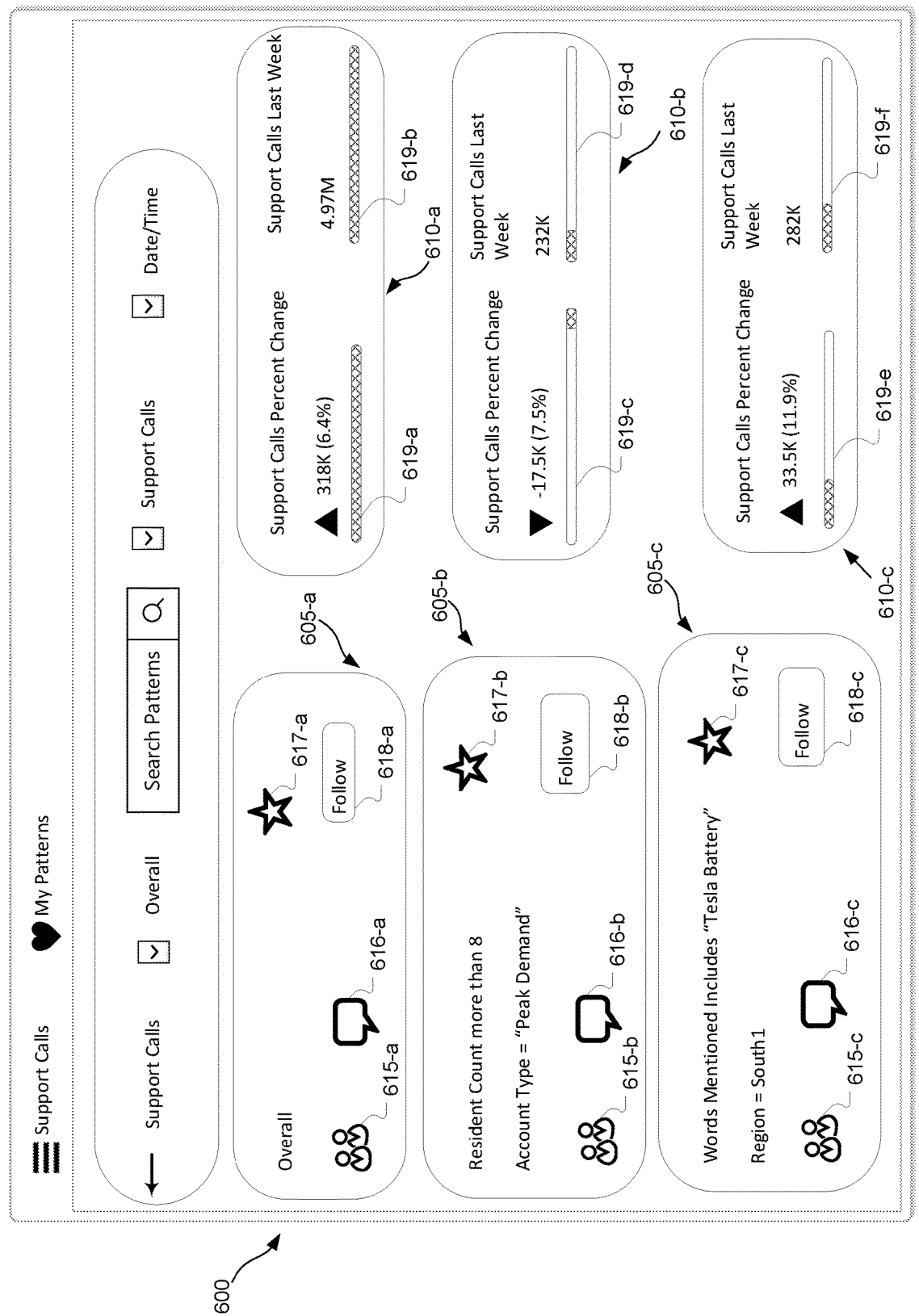
Figure 7:
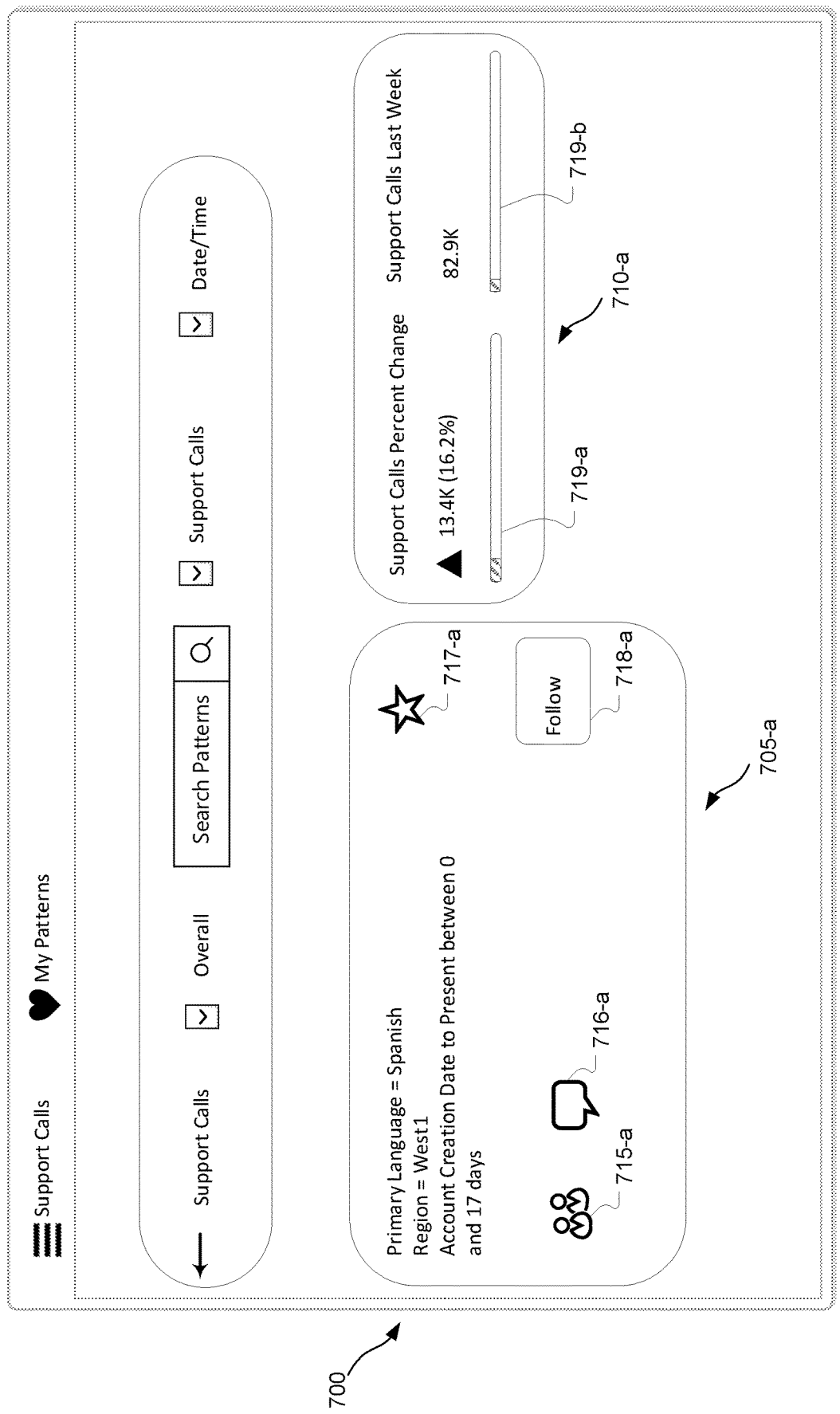

FIGS. 5-7 illustrate user interfaces 500-700, respectively. In some embodiments, user interfaces 500-700 may be examples of a main user interface displayed to users. As illustrated in FIG. 5, user interface 500, also referred to as UI 500, may display an overall listing 505-*a* for support calls. Further, UI 500 may display one or more statistics 510-*a* related to the overall listing 505-*a*

In some embodiments, UI 500 further displays a listing 505-*b* directed to one of many different data subsets and/or data patterns from the support calls dataset. In some embodiments, the support calls dataset may be associated with the overall listing 505-*a* for support calls. As further shown in FIG. 5, the UI 500 may display statistics 510-*b* associated with the listing 505-*b*. In some cases, statistics 510-*a* and 510-*b* may be examples of data patterns, previously described above. In some cases, overall listing 505 may display one or more buttons, such as user buttons 515-a and 515-b (e.g., for assigning the subset or a statistic of the subset to a given user, viewing list of users that have accessed the subset, etc.), comment buttons 516-a and 516-b (e.g., for adding a comment pertaining to the subset), favorite buttons 517-a and 517-b (e.g., for adding the subset to a favorites list), and follow buttons 518-a and 518-b (e.g., for following the subset and/or subsets related to it). In some embodiments, UI 500 may also display progress bars 519 (e.g., progress bars 519-a, 519-b, 519-c, 519-d) along with the one or more statistics 510, where the progress bars 519 may be used to depict, in a graphical form, the statistics pertaining to different data subsets as a fraction of the statistics for the input dataset. In some examples, any other relevant data visualizations, such as bar graphs, radar charts, pie charts, etc., may also be displayed via UI 500.

Turning now to FIG. 6, UI 600 may be used to display an overall listing 605-a and one or more statistics 610-a associated with the overall listing 605-a. In some embodiments, the overall listing 605-a and statistics 610-a may be the same as or similar to overall listing 505-a and statistics 510-a described in relation to FIG. 5. In some embodiments, the UI 600 may further display listing 605-b and statistics 610-b associated with the listing 605-b. In some embodiments, the overall listing 605-b and statistics 610-b may be the same as or similar to overall listing 505-b and statistics 510-b, respectively, as described above in relation to FIG. 5. As shown, the UI 600 may also display a listing 605-c and associated statistics 610-c. In some embodiments, listing 605-b and 605-c may be associated with different data patterns derived or generated from an input dataset directed to support calls. As shown, listings 605-b and 605-c may be examples of non-adjacent subsets since they do not comprise any common coordinates (i.e., coordinates for listing 605-b are [Resident Count>8, Account Type="Peak Demand"]; coordinates for listing 605-c are [Words=Tesla Battery, Region=South1]. In this way, UI 600 may allow a user to analyze and compare non-adjacent subsets in a seamless fashion.

Similar to FIG. 5, in some cases, overall listing 605-a may display one or more buttons, such as user buttons 615-a, 615-b, and 615-c (e.g., for assigning the subset or a statistic of the subset to a given user, viewing list of users that have accessed the subset, etc.), comment buttons 616-a, 616-b, and 616-c (e.g., for adding a comment pertaining to the subset), favorite buttons 617-a, 617-b, and 617-c (e.g., for adding the subset to a favorites list), follow buttons 618-a, 618-b, and 618-c (e.g., for following the subset and/or subsets related to it).

Further, UI 600 may display one or more statistics 610 related to the listings 605. In some embodiments, UI 600 may also display progress bars 619 (e.g., progress bars 619-a, 619-b, 619-c, 619-d, 619-e, and 619-f) along with the one or more statistics 610, where the progress bars 619 may be used to depict, in a graphical form, the statistics pertaining to different data subsets as a fraction of the statistics for the input dataset. In some other cases, UI 600 may also display any other relevant data visualizations, such as bar graphs or pie charts pertaining to the one or more statistics 610.

Turning now to FIG. 7, UI 700 may be used to display another listing 705-a showing a subset [Primary Language=Spanish, Region=West 1, Account Creation Date to Present between 0 and 17 days]. In some cases, UI 700 may also display statistics 710-a associated with the listing 705-a, including a percentage change in support calls as compared to the previous week, as well as the number of support calls last week. In some cases, the subset shown under listing 705-a, and the subsets shown under listings 605-b and 605-c of FIG. 6 may be examples of non-adjacent subsets, since they comprise no common coordinates. Thus, in some cases, a user may be able to view and analyze patterns and non-adjacent subsets for the support calls dataset via UIs 600 and/or 700.

As shown, and similar to FIGS. 5 and 6, listing 705-a may display one or more buttons, such as user button 715-a (e.g., for assigning the subset or a statistic of the subset to a given user, viewing list of users that have accessed the subset, etc.), comment button 716-a (e.g., for adding a comment pertaining to the subset), favorite button 717-a (e.g., for adding the subset to a favorites list), and follow button 718-a (e.g., for following the subset and/or other subsets related to it).

Further, UI 700 may display one or more statistics 710 related to the listing 705. In some embodiments, UI 700 may also display progress bars 719-a and 719-b along with the one or more statistics 710, where the progress bars 719 may be used to depict, in a graphical form, the statistics pertaining to different data subsets as a fraction of the statistics for the input dataset.

Figure 8:
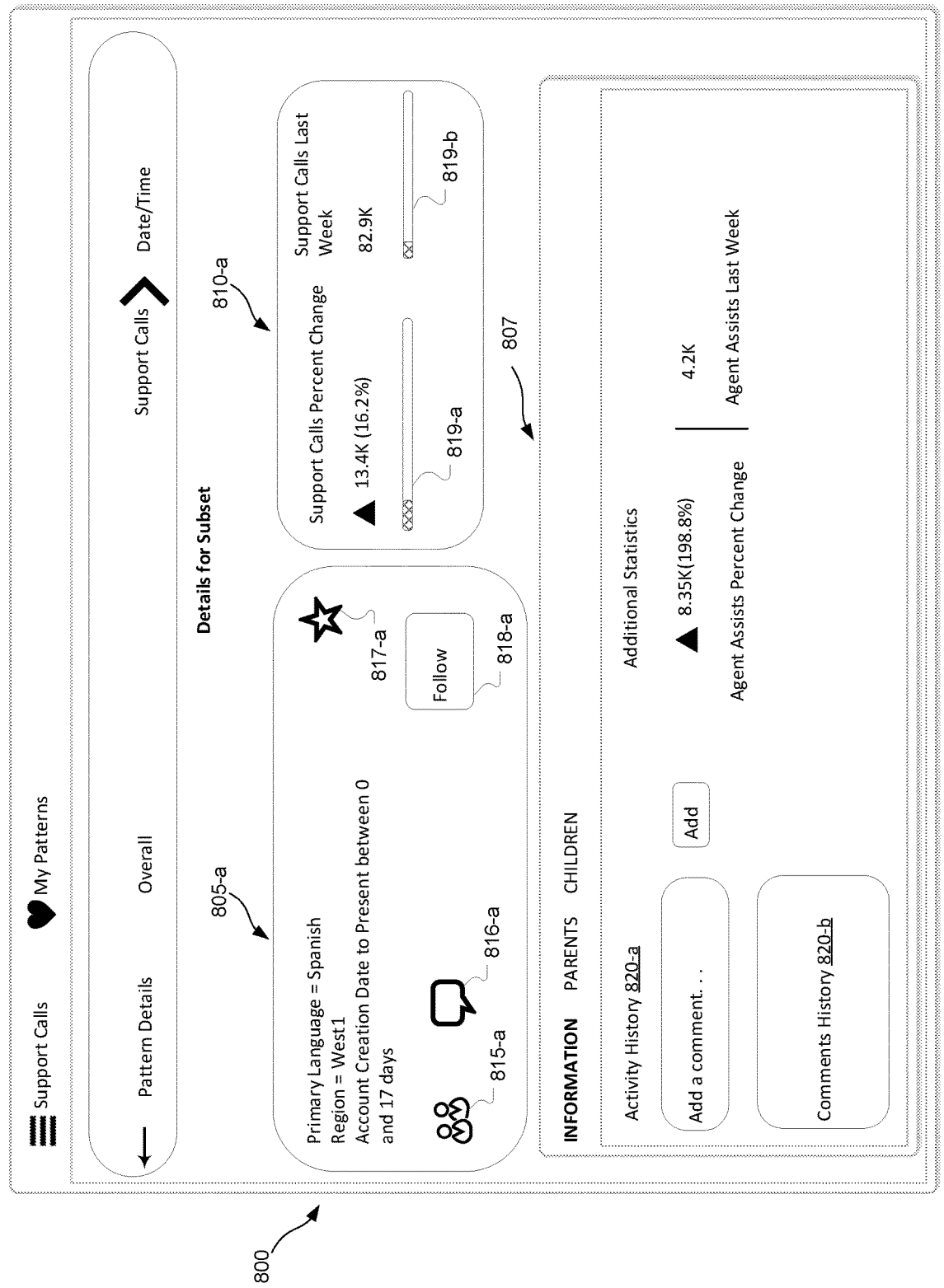

FIGS. 8-11 illustrate detailed interface sections that focus in on a single subset of an input dataset. As shown in FIG. 8, UI 800 displays the details for the subset [Primary Language=Spanish, Region=West1, Account Creation Date to Present between 0 and 17 days] in listing 805-a. In some cases, UI 800 may also display statistics 810-a, which may be an example of a data pattern, corresponding to the listing 805-a. UI 800 may implement one or more aspects of the figures described herein.

As shown, listing 805-a may display one or more buttons, such as user button 815-a (e.g., for assigning the subset or a statistic of the subset to a given user, viewing list of users that have accessed the subset, etc.), comment button 816-a (e.g., for adding a comment pertaining to the subset), favorite button 817-a (e.g., for adding the subset to a favorites list), and follow button 818-a (e.g., for following the subset and/or subsets related to it).

Further, UI 800 may display one or more statistics 810 related to the listing 805. In some embodiments, UI 800 may also display progress bars 819-a and 819-b along with the one or more statistics 810, where the progress bars 819 may be used to depict, in a graphical form, the statistics pertaining to different data subsets as a fraction of the statistics for the input dataset (i.e., shown in overall listings 505-a and 605-a in FIGS. 5 and 6, respectively).

In some embodiments, after a user selects to view the details for a data pattern, UI 800 may display section 807 via the user interface. As shown, section 807 may comprise multiple tabs (e.g., Information, Parents, Children, etc.). Under the Information tab, UI 800 may display additional statistics related to the subset in listing 805-a, activity history 820-a, comments history 820-b, etc. The UI 800 may also allow a user to add comments pertaining to the pattern and/or subset. In some circumstances, the system (e.g., system 100, 400, etc.) may utilize one or more of the activity history 820-a, comments history 820-b, etc., as further input for sorting and displaying subsets to a user. That is, the activity history 820-a and comments history 820-b may be used as user feedback interaction for sorting the subsets in the input dataset or another input dataset comprising similar subset defining criteria.

Figure 9:
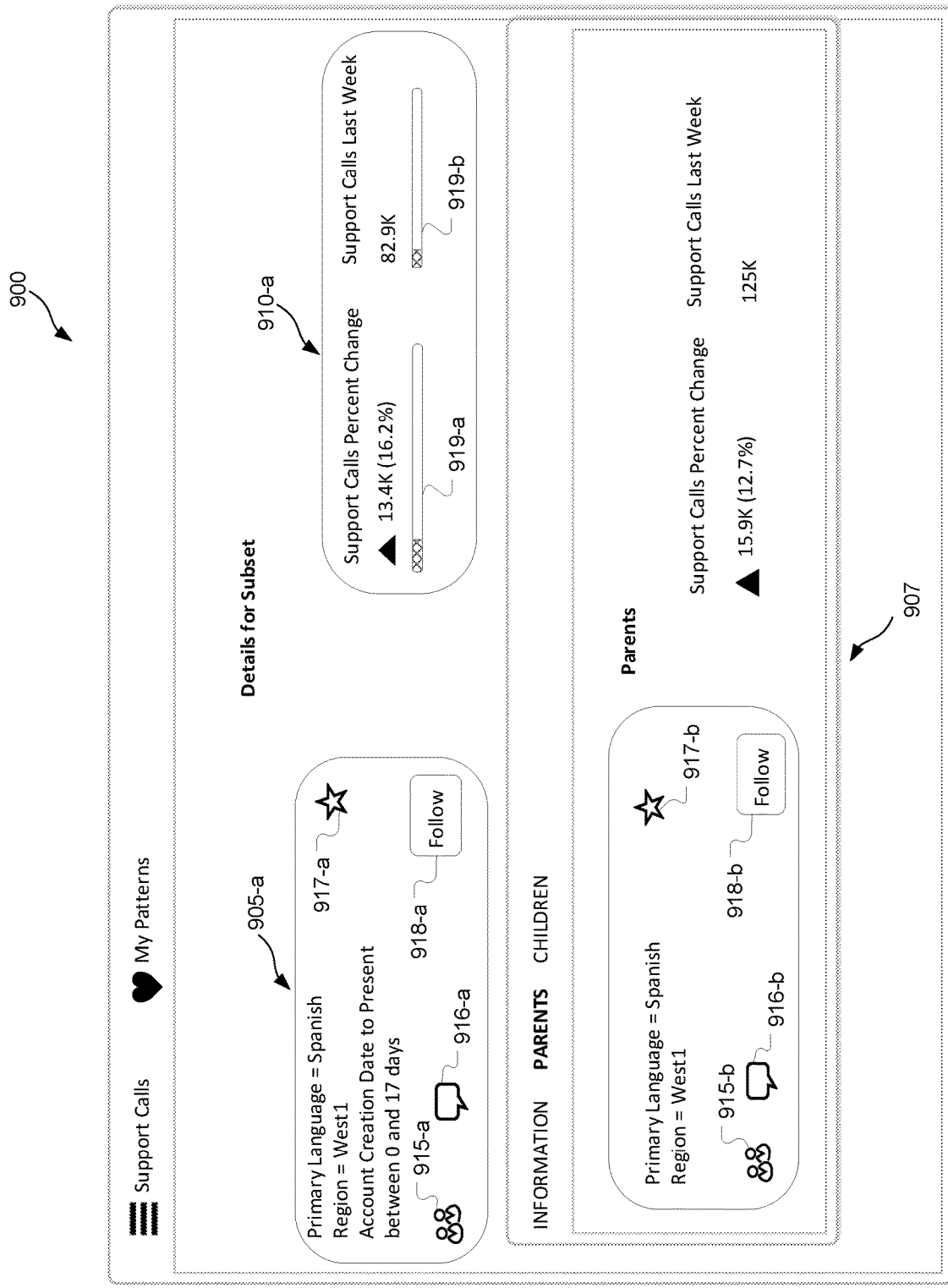

FIG. 9 illustrates a UI 900 according to an embodiment of the disclosure. In some examples, UI 900 depicts a detailed interface section focused on a single subset of an input dataset. UI 900 may implement one or more aspects of UI 800 described in relation to FIG. 8, or any other figure described herein. As shown, UI 900 displays the details for the subset [Primary Language=Spanish, Region=West1, Account Creation Date to Present between 0 and 17 days] shown in listing 905-*a*. In some cases, UI 900 may also display statistics 910-*a* associated with the subset in listing 905-*a*. It should be noted that statistics 910-*a* may be an example of a data pattern.

In some cases, listing 905-*a* may display one or more buttons, such as user button 915-*a*, comment button 916-*a*, favorite button 917-*a*, and follow button 918-*a*, which may be examples of the user button 515-*a*, comment button 516-*a*, favorite button 517-*a*, and follow button 518-*a*, respectively, as described in relation to FIG. 5. In some embodiments, UI 900 may also display progress bars 919 (e.g., progress bars 919-*a* and 919-*b*) along with the one or more statistics 910-*a*, where the progress bars 919 may be used to depict, in graphical form, the statistics pertaining to the subset.

In some embodiments, after a user selects to view the details for a particular pattern or subset, UI 900 may be used to display section 907, which may be the same as or similar to section 807 in FIG. 8. Similar to section 807, section 907 may be displayed to the user via a user interface, and may comprise multiple tabs (e.g., Information, Parents, Children, etc.). In some cases, the Parents tab may display information pertaining to one or more additional subsets comprising notable characteristics, where the one or more additional subsets contain the subset shown in listing 905-*a*. In some aspects, the Parents section may be akin to going up the structure of a Directed Acyclic Graph (DAG). A DAG may refer to a finite directed graph with no directed cycles. In some cases, DAGs may be used to be model probabilities, connectivity, and/or causality. In some cases, section 907 may also display one or more buttons, such as user button 915-*b*, comment button 916-*b*, favorite button 917-*b*, and follow button 918-*b*, which may be examples of the user button 915-*a*, comment button 916-*a*, favorite button 917-*a*, and follow button 918-*a*, respectively, as described above.

As shown in FIG. 9, the subset [Primary Language=Spanish, Region=West1, Account Creation Date to Present between 0 and 17 days] may comprise a parent subset [Primary Language=Spanish, Region=West1], where the subset and its parent have two coordinates (i.e., Primary Language=Spanish, Region=West1] in common.

Figure 10:
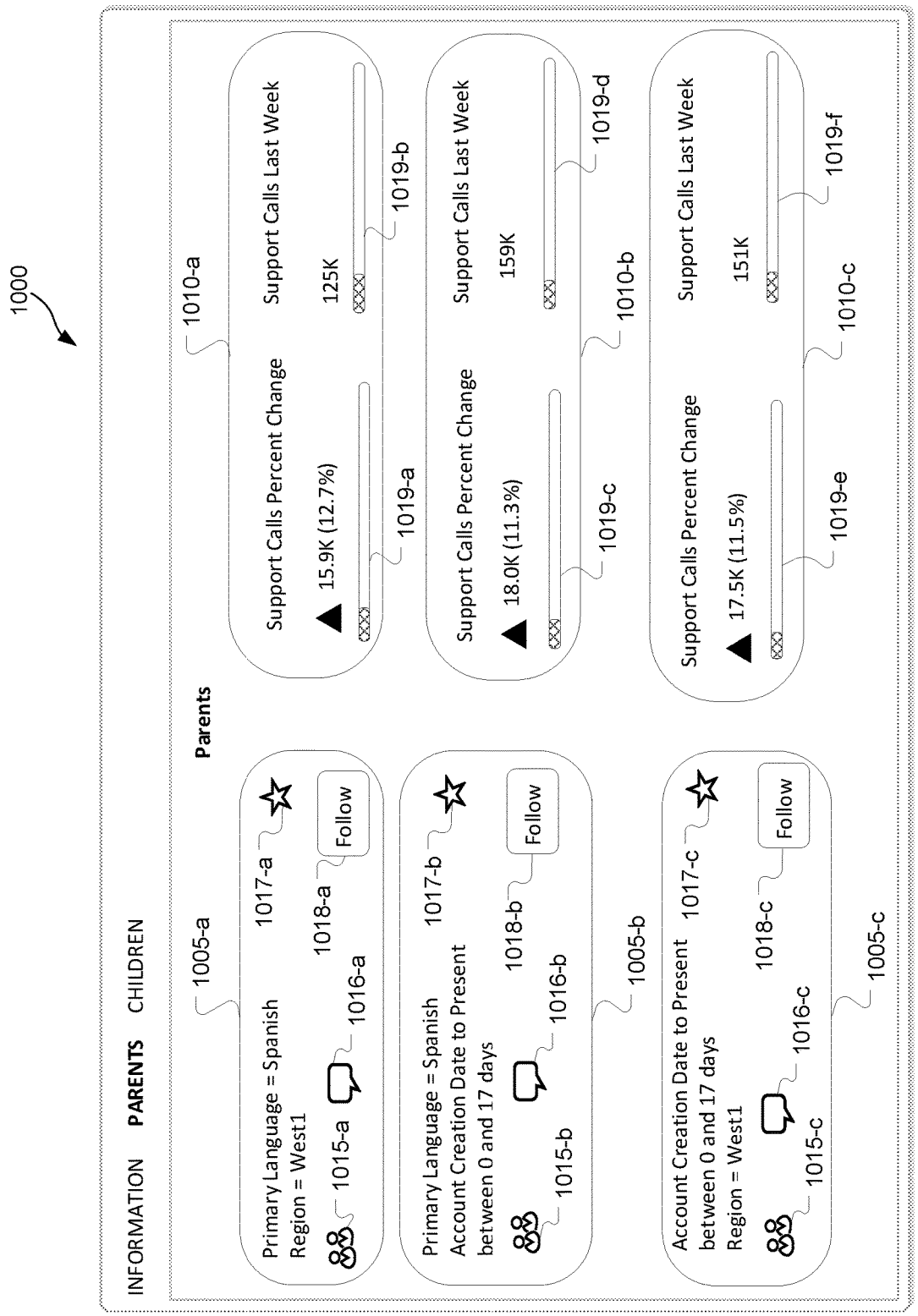

Turning now to FIG. 10, which is an example of a detailed interface section focusing on the single subset previously seen in FIG. 9. In particular, FIG. 10 illustrates UI 1000 which may be used to display one or more parent subsets of a child subset. In this example, the subsets [Primary Language=Spanish, Region=West 1], [Primary Language=Spanish, Account Creation Date to Present between 0 and 17 days], and [Account Creation Date to Present between 0 and 17 days, Region=West1] shown in listings 1005-*a*, 1005-*b*, and 1005-*c*, respectively, may be parents of the subset [Primary Language=Spanish, Region=West1, Account Creation Date to Present between 0 and 17 days]. Said another way, the subset [Primary Language=Spanish, Region=West1, Account Creation Date to Present between 0 and 17 days] may be a child of the subsets shown in listings 1005-*a*, 1005-*b*, and 1005-*c*.

In some examples, the UI 1000 may also display one or more statistics associated with the parent subsets, including statistics 1010-*a*, 1010-*b*, and 1010-*c*. In some cases, statistics 1010 may be examples of data patterns.

Similar to the figures above, in some cases, listings 1005 may display one or more buttons, such as user buttons 1015-*a*, 1015-*b*, and 1015-*c* (e.g., for assigning the subset or a statistic of the subset to a given user, viewing list of users that have accessed the subset, etc.), comment buttons 1016-*a*, 1016-*b*, and 1016-*c* (e.g., for adding a comment pertaining to the subset), favorite buttons 1017-*a*, 1017-*b*, and 1017-*c* (e.g., for adding the subset to a favorites list), follow buttons 1018-*a*, 1018-*b*, and 1018-*c* (e.g., for following the subset and/or subsets related to it).

Further, UI 1000 may display one or more statistics 1010 related to the listings 1005. In some embodiments, UI 1000 may also display progress bars 1019 (e.g., progress bars 1019-*a*, 1019-*b*, 1019-*c*, 1019-*d*, 1019-*e*, and 1019-*f*) along with the one or more statistics 1010, where the progress bars 1019 may be used to depict, in graphical form, the statistics pertaining to different data subsets as a fraction of the statistics for an input dataset. In other embodiments, UI 1000 may display data visualizations such as bar charts, column charts, pie charts, area charts, doughnut charts, comparison charts, to name a few non-limiting examples.

Figure 11:
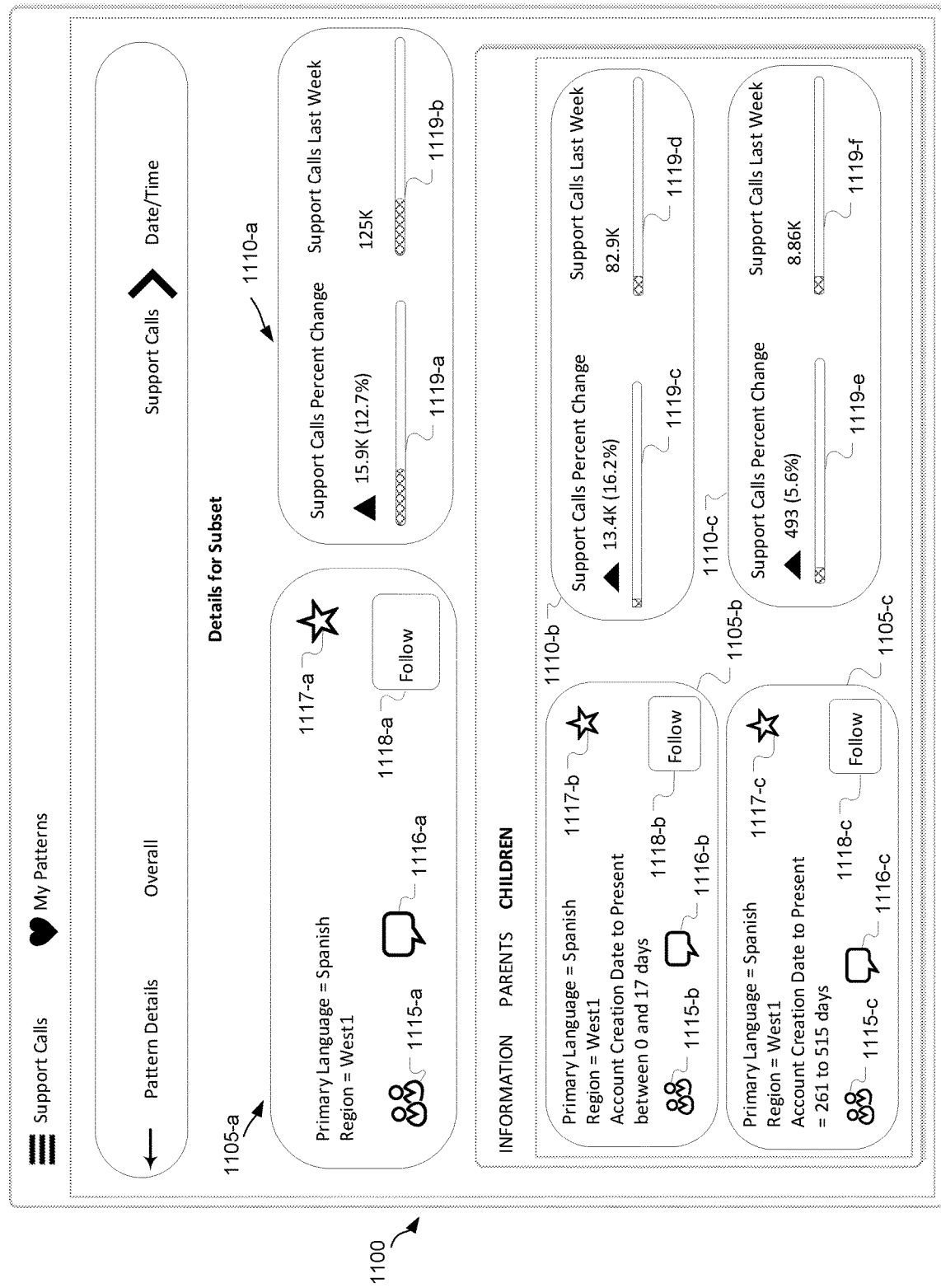

FIG. 11 is an example of a detailed interface section focusing on one or more subsets previously discussed in relation to FIGS. 8, 9 and 10. In particular, FIG. 11 illustrates UI 1100 which may be used to display the children of a subset [Primary Language=Spanish, Region=West 1] shown in listing 1105-*a*. The UI 1100 may further display one or more statistics 1110-*a*, or a data pattern, associated with the subset. In some embodiments, the UI 1100 may implement one or more aspects of UIs 800-1000 as described in relation to FIGS. 8-10, or any other figure described herein. In some cases, listing 1105-*a* may display one or more buttons, such as user button 1115-*a*, comment button 1116-*a*, favorite button 1117-*a*, and follow button 1118-*a*, which may be examples of the user button 515-*a*, comment button 516-*a*, favorite button 517-*a*, and follow button 518-*a*, respectively, as described in relation to FIG. 5. In some embodiments, UI 1100 may also display progress bars 1119 (e.g., progress bars 1119-*a* and 1119-*b*) along with the one or more statistics 1110-*a*, where the progress bars 1119 may be examples of the progress bars 519 shown in FIG. 5.

In some embodiments, under the Children tab, UI 1100 may display a first subset [Primary Language=Spanish, Region=West 1, Account Creation Date to Present between 0 and 17 days] in listing 1105-*b*. In some cases, the first subset may be a child of the subset [Primary Language=Spanish, Region=West1] shown in listing 1105-*a*, since the first subset shares two of its three coordinates with the parent subset (i.e., [Primary Language=Spanish, Region=West1]).

Additionally or alternatively, UI 1100 may also display a second subset in listing 1105-*c* [Primary Language=Spanish, Region=West 1, Account Creation Date to Present between 261 to 515 days], which may also be an example of a child subset of the subset in listing 1105-*a*. In some examples, UI 1100 may display one or more statistics 1110-*b* and 1110-*c*, also known as data patterns, associated with the first and second subsets 1105-*b* and 1105-*c*, respectively. In some cases, the data patterns or statistics 1110 may be numerical and quantifiable in nature, allowing comparison of a same statistic between different subsets, a subset with respect to its parent set(s), or even the whole input data set.

In some embodiments, the Children tab may also display one or more buttons, such as user buttons 1115-*b* and 1115-*c*, comment buttons 1116-*b* and 1116-*c*, favorite buttons 1117-*b* and 1117-*c*, and follow buttons 1118-*b* and 1118-*c*, which may be examples of the user button 515-*a*, comment button 516-*a*, favorite button 517-*a*, and follow button 518-*a*, respectively, as described above in relation to FIG. 5. In some embodiments, UI 1100 may also display progress bars 1119 (e.g., progress bars 1119-*c*, 1119-*d*, 1119-*e*, 1119-*f*) or other data visualizations (not shown) along with the one or more statistics 1110-*b* and 1110-*c*, where the progress bars 1119 may be examples of the progress bars 519 shown in FIG. 5.

In some aspects, the information displayed in the Children section is akin to drilling down in subsets that are children of the current subset (i.e., subset shown in listing 1105-*a*) in the Directed Acyclic Graph (DAG). In other words, one or more dimensions or coordinates may be added to the subset [Primary Language=Spanish, Region=West1] to generate additional subsets, including the first and second subsets shown in listings 1105-*b* and 1105-*c*, respectively. Further, the additional subsets generated may be children of the subset shown in listing 1105-*a*.

Alternate Embodiments

A number of alternate embodiments disclosed herein are listed below. In some embodiments, data patterns may refer to numerical data patterns. Further, identifying notable characteristics may refer to identifying numerical characteristics that are notable when compared to a same numerical characteristic for an input data subset or a parent set (when applicable). In some cases, the term notable data subsets may refer to data subsets comprising notable characteristics, such as notable numerical characteristics. In other words, the numerical characteristics may be quantifiable, and may be notable when compared to a same numerical characteristic for the input data set. In some cases, the data patterns or statistics may be numerical and quantifiable in nature, allowing comparison of a same statistic between different subsets, a subset with respect to its parent set(s) or children set(s), or even the whole input data set. Furthermore, while generally described as numerical data patterns, notable numerical characteristics, or the like, it should be noted that other types of non-numerical data patterns or characteristics are contemplated in different embodiments.

One aspect of the present disclosure relates to a method for comparing non-adjacent data subsets. The method may include receiving an input data set, where the input data set includes information (e.g., numerical, alpha-numerical, characters, strings, categorical, etc.) to be analyzed, generating at least one list of data subsets of the input data set, determining whether at least one data subset of the at least one list of data subsets contains a notable characteristic (e.g., a numerical characteristic that is notable when compared to a same numerical characteristic for the input data set), identifying at least one data pattern (e.g., numerical data pattern) in the at least one list of data subsets of the input data set, sorting data subsets of the at least one list of data subsets of the input data set based in part on identifying the at least one numerical data pattern, and displaying, via an user interface, the data subsets of the at least one list of data subsets and the at least one numerical data pattern based on the sorting, wherein the interactive user interface comprises one or more data visualizations for the at least one numerical data pattern, and wherein the interactive user interface is configured to accept a user input action based on identifying a user interaction with at least one data subset of the list of data subsets. In some embodiments, the display aspect of the system may utilize a conversational interface implementing natural language processing (NLP) techniques. For instance, the interactive user interface may be adapted to converse with a user, which may include responding to a user's questions, asking the user questions, requesting the user for further information, describing aspects of the analysis in free-flowing sentence form, etc.

Still another aspect of the present disclosure relates to a system configured for comparing non-adjacent data subsets. The system may include means for receiving an input data set, where the input data set includes information (e.g., numerical, alpha-numerical, characters, strings, categorical, etc.) to be analyzed, means for generating at least one list of data subsets of the input data set, means for determining whether at least one data subset of the at least one list of data subsets contains a notable characteristic (e.g., a numerical characteristic that is notable when compared to a same numerical characteristic for the input data set), means for identifying at least one data pattern (e.g., numerical data pattern) in the at least one list of data subsets of the input data set, means for sorting data subsets of the at least one list of data subsets of the input data set based in part on identifying the at least one numerical data pattern, and means for displaying, via an interactive user interface, the data subsets of the at least one list of data subsets and the at least one numerical data pattern based on the sorting, wherein the interactive user interface comprises one or more data visualizations for the at least one numerical data pattern, and wherein the interactive user interface is configured to accept a user input action based on identifying a user interaction with at least one data subset of the list of data subsets. In some embodiments, the display aspect of the system may utilize a conversational interface implementing NLP techniques. For instance, the interactive user interface may be adapted to converse with a user, which may include responding to a user's questions, asking the user questions, requesting the user for further information, describing aspects of the analysis in free-flowing sentence form, etc.

Even another aspect of the present disclosure relates to a non-transient computer-readable storage medium having instructions embodied thereon, the instructions being executable by one or more processors to perform a method for comparing non-adjacent data subsets. The method may include receiving an input data set, where the input data set includes information to be analyzed, generating at least one list of data subsets of the input data set, determining whether at least one data subset of the at least one list of data subsets contains a numerical characteristic that is notable when compared to a same numerical characteristic for the input data set, identifying at least one numerical data pattern in the at least one list of data subsets of the input data set, sorting data subsets of the at least one list of data subsets of the input data set based in part on identifying the at least one numerical data pattern, and displaying, via an user interface, the data subsets of the at least one list of data subsets and the at least one numerical data pattern based on the sorting, wherein the interactive user interface comprises one or more data visualizations for the at least one numerical data pattern, and wherein the interactive user interface is configured to accept a user input action based on identifying a user interaction with at least one data subset of the list of data subsets. As described above, in some embodiments, the display aspect of the system may utilize a conversational interface implementing NLP techniques. For instance, the interactive user interface may be adapted to converse with a user, which may include responding to a user's questions, asking the user questions, requesting the user for further information, describing aspects of the analysis in free-flowing sentence form, etc.

Still another aspect of the present disclosure may relate to a system configured for comparing non-adjacent subsets. The system may include one or more hardware processors configured by machine-readable instructions to receive an input data set, the input data set including information to be analyzed, generate a list of data subsets of the input data set, generate a list of data patterns for the list of data subsets, iteratively apply a heuristic to each data pattern of the list of data patterns, identify notable characteristics for at least a portion of data patterns of the list of data patterns based on iteratively applying the heuristic, identify at least a portion of data subsets of the list of data subsets associated with at least the portion of data patterns, sort at least the portion of data subsets of the list of data subsets, display, via a user interface, at least the portion of data subsets of the list of data subsets, based on the sorting.

Another aspect of the present disclosure may relate to a system configured for comparing non-adjacent subsets. The system may include one or more hardware processors configured by machine-readable instructions to receive an input data set, the input data set including information to be analyzed, generate at one list of data subsets of the input data set, apply a heuristic to at least one data subset of the at least one list of data subsets, determine whether the at least one data subset includes one or more notable characteristics, identify at least one data pattern in the at least one data subset based at least in part on the determining, iteratively apply the heuristic to the at least one data pattern, sort data subsets in the at least one list of data subsets, and display, via a user interface, the data subsets in the at least one list of data subsets, based on the sorting.

Another aspect of the present disclosure may relate to a system configured for comparing non-adjacent subsets. The system may include one or more hardware processors configured by machine-readable instructions to receive an input data set, the input data set including information to be analyzed, generate at one list of data subsets of the input data set, apply a heuristic to data subsets of the at least one list of data subsets, determine for each data subset of the at least one list of data subsets whether a respective data subset includes one or more notable characteristics, generate a sub-list of data subsets from the at least one list of data subsets based in part on the determining, identify at least one data pattern in the sub-list of data subsets, iteratively apply the heuristic to the at least one data pattern, sort data subsets in the at least one sub-list of data subsets, and display, via a user interface, the data subsets in the at least one sub-list of data subsets, based on the sorting.

Yet another aspect of the present disclosure relates to a method for comparing non-adjacent subsets, wherein the method comprises: receiving an input data set, the input data set including information to be analyzed, generating a list of data subsets of the input data set, generating a list of data patterns for the list of data subsets, iteratively applying a heuristic to each data pattern of the list of data patterns, identifying notable characteristics for at least a portion of data patterns of the list of data patterns based on iteratively applying the heuristic, identifying at least a portion of data subsets of the list of data subsets associated with at least the portion of data patterns, sorting at least the portion of data subsets of the list of data subsets, displaying, via a user interface, at least the portion of data subsets of the list of data subsets, based on the sorting.

Still another aspect of the present disclosure relates to a non-transient computer-readable storage medium having instructions embodied thereon, the instructions being executable by one or more processors to perform a method for comparing non-adjacent subsets, wherein the method comprises: receiving an input data set, the input data set including information to be analyzed, generating a list of data subsets of the input data set, generating a list of data patterns for the list of data subsets, iteratively applying a heuristic to each data pattern of the list of data patterns, identifying notable characteristics for at least a portion of data patterns of the list of data patterns based on iteratively applying the heuristic, identifying at least a portion of data subsets of the list of data subsets associated with at least the portion of data patterns, sorting at least the portion of data subsets of the list of data subsets, displaying, via a user interface, at least the portion of data subsets of the list of data subsets, based on the sorting.

Still another aspect of the present disclosure may relate to a method for comparing non-adjacent subsets, the method comprising: receiving an input data set, the input data set including information to be analyzed, generating at one list of data subsets of the input data set, applying a heuristic to at least one data subset of the at least one list of data subsets, determining whether the at least one data subset includes one or more notable characteristics, identifying at least one data pattern in the at least one data subset based at least in part on the determining, iteratively applying the heuristic to the at least one data pattern, sorting data subsets in the at least one list of data subsets, and displaying, via a user interface, the data subsets in the at least one list of data subsets, based on the sorting.

Even another aspect of the present disclosure may relate to a method for comparing non-adjacent subsets, wherein the method comprises: receiving an input data set, the input data set including information to be analyzed, generating at one list of data subsets of the input data set, applying a heuristic to data subsets of the at least one list of data subsets, determining for each data subset of the at least one list of data subsets whether a respective data subset includes one or more notable characteristics, generating a sub-list of data subsets from the at least one list of data subsets based in part on the determining, identifying at least one data pattern in the sub-list of data subsets, iteratively applying the heuristic to the at least one data pattern, sorting data subsets in the sub-list of data subsets, and displaying, via a user interface, the data subsets in the sub-list of data subsets, based on the sorting.

Still another aspect of the present disclosure relates to a non-transient computer-readable storage medium having instructions embodied thereon, the instructions being executable by one or more processors to perform a method for comparing non-adjacent subsets, the method comprising: receiving an input data set, the input data set including information to be analyzed, generating at one list of data subsets of the input data set, applying a heuristic to at least one data subset of the at least one list of data subsets, determining whether the at least one data subset includes one or more notable characteristics, identifying at least one data pattern in the at least one data subset based at least in part on the determining, iteratively applying the heuristic to the at least one data pattern, sorting data subsets in the at least one list of data subsets, and displaying, via a user interface, the data subsets in the at least one list of data subsets, based on the sorting.

Still another aspect of the present disclosure relates to a non-transient computer-readable storage medium having instructions embodied thereon, the instructions being executable by one or more processors to perform a method for comparing non-adjacent subsets, wherein the method comprises: receiving an input data set, the input data set including information to be analyzed, generating at one list of data subsets of the input data set, applying a heuristic to data subsets of the at least one list of data subsets, determining for each data subset of the at least one list of data subsets whether a respective data subset includes one or more notable characteristics, generating a sub-list of data subsets from the at least one list of data subsets based in part on the determining, identifying at least one data pattern in the sub-list of data subsets, iteratively applying the heuristic to the at least one data pattern, sorting data subsets in the sub-list of data subsets, and displaying, via a user interface, the data subsets in the sub-list of data subsets, based on the sorting.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for comparing non-adjacent data subsets, the system comprising:
   one or more hardware processors configured by machine-readable instructions to:
   receive an input data set, the input data set including information to be analyzed;
   generate a plurality of data subsets of the input data set, wherein each data subset is defined by a set of filters;
   analyze the plurality of data subsets to determine two or more non-adjacent data subsets having notable statistical patterns, wherein the two or more non-adjacent data subsets have distinct sets of filters with no shared filter between them; and
   display, via a user interface, one or more of the distinct sets of filters and corresponding one or more notable statical patterns for comparison of the non-adjacent data subsets.

2. The system of claim 1, wherein the one or more hardware processors are further configured by machine-readable instructions to iteratively apply a heuristic to the plurality of data subsets to determine the two or more non-adjacent data subsets having the notable statistical patterns.

3. The system of claim 1, wherein the one or more hardware processors are further configured by machine-readable instructions to provide a plurality of filters along with the input data set.

4. The system of claim 3, wherein the plurality of filters are used to determine the notable statistical patterns of the two or more non-adjacent data subsets.

5. The system of claim 1, wherein the one or more hardware processors are further configured by machine-readable instructions to determine whether a data subset has a notable statistical pattern based on a performance metric relative to other statical patterns of the plurality of data subsets.

6. The system of claim 1, wherein the one or more hardware processors are further configured by machine-readable instructions to:
   identify a user interaction with at least one data subset of the plurality of data subsets of the input data set;
   determine whether the user interaction is indicative of interest in the at least one data subset of the plurality of data subsets of the input data set;
   associate the user interaction with a data pattern feedback characteristic; and
   generate an additional plurality of data subsets based at least in part on the data pattern feedback characteristic.

7. The system of claim 6, wherein the one or more hardware processors are further configured by machine-readable instructions to: use one or more other user interactions for heuristics, wherein the one or more other user interactions are linked to a different dataset having at least one common subset-defining criteria to the input data set.

8. The system of claim 1, wherein the one or more hardware processors are further configured by machine-readable instructions to: determine the notable statistical patterns using one of supervised, semi-supervised, or unsupervised machine learning.

9. The system of claim 1, wherein the one or more hardware processors are further configured by machine-readable instructions to:
   generate an additional plurality of data subsets from a different data set interrelated with the input data set; and
   analyze the plurality of data subsets and the additional plurality of data subsets concurrently to determine non-adjacent data subsets having notable statistical patterns across the different data set and the input data set.

10. The system of claim 9, wherein the one or more hardware processors are further configured by machine-readable instructions to:
    display, via the user interface, filters of the additional plurality of data subsets and corresponding notable statistical patterns of the filters, wherein the filters derive from the different data set.

11. The system of claim 10, wherein the one or more hardware processors are further configured by machine-readable instructions to:
    determine which of the filters to display based in part on whether they derive from the input data set or the different data set; and
    display determined ones of the filters and corresponding notable statistical patterns.

12. The system of claim 10, wherein the one or more hardware processors are further configured by machine-readable instructions to:
    determine sets of filters from both the input data set and the different data set that have a common performance metric; and
    display the determined sets of filters and corresponding common performance metric.

13. The system of claim 1, wherein the one or more hardware processors are further configured by machine-readable instructions to:
    determine filters associated with multiple performance metrics; and
    display the determined filters and corresponding multiple performance metrics.

14. The system of claim 1, wherein the one or more hardware processors are further configured by machine-readable instructions to:
    sort the plurality of data subsets based on one or more of an intrinsic heuristic, a derived heuristic, a business metric, and a user's previous interactions with a similar data subset; and display the one or more of the distinct sets of filters and corresponding one or more notable statical patterns based on the sorting.

15. A method of comparing non-adjacent data subsets, comprising:

receiving an input data set, the input data set including information to be analyzed;

generating a plurality of data subsets of the input data set, wherein each data subset is defined by a set of filters;

analyzing the plurality of data subsets to determine two or more non-adjacent data subsets having notable statistical patterns, wherein the two or more non-adjacent data subsets have distinct sets of filters with no shared filter between them; and displaying, via a user interface, one or more of the distinct sets of filters and corresponding one or more notable statical patterns for comparison of the non-adjacent data subsets.

16. The method of claim 15, further comprising iteratively applying a heuristic to the plurality of data subsets to determine the two or more non-adjacent data subsets having the notable statistical patterns.

17. The method of claim 15, further comprising providing a plurality of filters along with the input data set.

18. A non-transient computer-readable storage medium having instructions embodied thereon, the instructions being executable by one or more processors to perform a method for comparing non-adjacent data subsets, the method comprising:

receiving an input data set, the input data set including information to be analyzed;

generating a plurality of data subsets of the input data set, wherein each data subset is defined by a set of filters;

analyzing the plurality of data subsets to determine two or more non-adjacent data subsets having notable statistical patterns, wherein the two or more non-adjacent data subsets have distinct sets of filters with no shared filter between them; and displaying, via a user interface, one or more of the distinct sets of filters and corresponding one or more notable statical patterns for comparison of the non-adjacent data subsets.

19. The non-transient computer-readable storage medium of claim 18, wherein the method further comprises:

iteratively applying a heuristic to the plurality of data subsets to determine the two or more non-adjacent data subsets having the notable statistical patterns.

20. The non-transient computer-readable storage medium of claim 18, wherein the method further comprises:

providing a plurality of filters along with the input data set.

* * * * *